US 12,346,892 B2

United States Patent
Shekhar et al.

(10) Patent No.: US 12,346,892 B2
(45) Date of Patent: Jul. 1, 2025

(54) ELECTRONIC ACCOUNT TRANSFERS IN CASINO ENVIRONMENTS

(71) Applicant: Aristocrat Technologies, Inc., Las Vegas, NV (US)

(72) Inventors: Shivendu Shekhar, Jyväskylä (FI); Michael Smith, Las Vegas, NV (US); Samarth Raman, Las Vegas, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 304 days.

(21) Appl. No.: 17/958,117

(22) Filed: Sep. 30, 2022

(65) Prior Publication Data

US 2024/0112175 A1 Apr. 4, 2024

(51) Int. Cl.
*G07F 17/32* (2006.01)
*G06Q 20/10* (2012.01)
*G06Q 20/36* (2012.01)

(52) U.S. Cl.
CPC ............ *G06Q 20/363* (2013.01); *G06Q 20/10* (2013.01); *G06Q 20/3676* (2013.01); *G07F 17/3239* (2013.01); *G07F 17/3251* (2013.01);

(58) Field of Classification Search
CPC ............ G07F 17/3244; G07F 17/3241; G07F 17/3225; G07F 17/3251; G07F 17/3239; G06Q 20/3672; G06Q 20/36; G06Q 20/3676; G06Q 20/10; G06Q 20/363
USPC ......................................................... 463/23
See application file for complete search history.

(56) References Cited

U.S. PATENT DOCUMENTS

| | | |
|---|---|---|
| 5,830,067 A | 11/1998 | Graves |
| 5,967,895 A | 10/1999 | Kellen |
| 6,183,362 B1 | 2/2001 | Boushy |
| 6,306,038 B1 | 10/2001 | Graves |
| 6,311,976 B1 | 11/2001 | Yoseloff |
| 6,988,946 B2 | 1/2006 | Michaelson |
| 7,066,815 B2 | 6/2006 | Walker |
| 7,128,652 B1 | 10/2006 | Lavoie |
| 7,524,244 B2 | 4/2009 | Walker |
| 7,588,495 B2 | 9/2009 | Walker |
| 7,727,071 B2 | 6/2010 | Giobbi |
| 7,785,183 B1 | 8/2010 | Stockham |

(Continued)

OTHER PUBLICATIONS

Office Action (Non-Final Rejection) dated Jun. 24, 2022 for U.S. Appl. No. 17/491,200 (pp. 1-11).

(Continued)

*Primary Examiner* — Michael A Cuff
(74) *Attorney, Agent, or Firm* — Armstrong Teasdale LLP

(57) ABSTRACT

An electronic gaming system including a memory device with instructions stored thereon and a processor in communication with a plurality of electronic gaming devices and the memory device is described. The instructions, when executed by the processor, cause the processor to receive digital wallet registration data including a digital wallet ID, determine that the digital wallet registration data is associated with a first player account, and store a digital wallet flag in the first player account. The instructions also cause the processor to, upon receipt of player data based on a card-in event, determine that the player data is associated with the first player account, determine that the digital wallet flag is stored in the first player account, and cause access to the digital wallet to be provided.

20 Claims, 35 Drawing Sheets

(56) References Cited

U.S. PATENT DOCUMENTS

| | | |
|---|---|---|
| 7,806,761 B2 | 10/2010 | Walker |
| 7,815,502 B2 | 10/2010 | Hardy |
| 8,475,257 B2 | 7/2013 | Bienvenue |
| 9,305,427 B2 | 4/2016 | Walker |
| 9,558,619 B2 | 1/2017 | Froy |
| 9,659,435 B2 | 5/2017 | Rogers |
| 9,659,459 B2 | 5/2017 | Phillips |
| 9,922,493 B2 | 3/2018 | Walker |
| 10,269,209 B2 | 4/2019 | Miltenberger |
| 10,726,670 B2 | 7/2020 | Price |
| 11,508,217 B2 | 11/2022 | Harris |
| 2001/0007815 A1 | 7/2001 | Philipsson |
| 2002/0094860 A1 | 7/2002 | Itkis |
| 2004/0053694 A1 | 3/2004 | Rowe |
| 2004/0082384 A1 | 4/2004 | Walker |
| 2004/0148251 A1 | 7/2004 | Kavoun |
| 2004/0248645 A1 | 12/2004 | Blackburn |
| 2005/0059467 A1 | 3/2005 | Saffari |
| 2005/0187014 A1 | 8/2005 | Saffari |
| 2005/0193209 A1 | 9/2005 | Saunders |
| 2005/0250569 A1 | 11/2005 | Kane |
| 2006/0154727 A1 | 7/2006 | Okuniewicz |
| 2006/0205477 A1 | 9/2006 | Fisk |
| 2006/0205481 A1 | 9/2006 | Dominelli |
| 2006/0247035 A1 | 11/2006 | Rowe |
| 2007/0060237 A1 | 3/2007 | Rowe |
| 2007/0202941 A1 | 8/2007 | Miltenberger |
| 2007/0259709 A1* | 11/2007 | Kelly ................ G07F 17/3211 463/20 |
| 2007/0298873 A1 | 12/2007 | Nguyen |
| 2008/0150678 A1 | 6/2008 | Giobbi |
| 2009/0111560 A1 | 4/2009 | Davis |
| 2009/0143128 A1 | 6/2009 | Cautley |
| 2009/0275399 A1* | 11/2009 | Kelly ................ G07F 17/323 463/27 |
| 2009/0276341 A1* | 11/2009 | McMahan ............ G06Q 40/12 235/375 |
| 2010/0229108 A1 | 9/2010 | Gerson |
| 2011/0245943 A1 | 10/2011 | Agarwal |
| 2011/0287823 A1 | 11/2011 | Guinn |
| 2012/0225726 A1 | 9/2012 | Anderson |
| 2013/0130766 A1 | 5/2013 | Harris |
| 2014/0221071 A1 | 8/2014 | Calio |
| 2014/0256407 A1 | 9/2014 | Graf |
| 2014/0274277 A1 | 9/2014 | Cuddy |
| 2014/0357354 A1 | 12/2014 | Gura |
| 2015/0194020 A1 | 7/2015 | Lamendola |
| 2015/0235507 A1 | 8/2015 | Newton |
| 2015/0302482 A1 | 10/2015 | Vagner |
| 2016/0335855 A1 | 11/2016 | Ishibashi |
| 2017/0270493 A1 | 9/2017 | Lugli |
| 2019/0220853 A1 | 7/2019 | Srinivasan |
| 2020/0043045 A1* | 2/2020 | Jurich, Jr. ............ G06Q 20/405 |
| 2020/0051377 A1 | 2/2020 | Montenegro |
| 2020/0099694 A1 | 3/2020 | Weiss |
| 2020/0226885 A1 | 7/2020 | Weaver |
| 2020/0402353 A1 | 12/2020 | Higgins |
| 2021/0134104 A1 | 5/2021 | Harris |
| 2021/0233351 A1 | 7/2021 | Meltzer |
| 2021/0327189 A1* | 10/2021 | Jarvis ................ G06Q 50/265 |
| 2022/0032168 A1 | 2/2022 | Gupta |
| 2022/0036692 A1 | 2/2022 | Gupta |
| 2022/0270434 A1 | 8/2022 | Welch |
| 2023/0137728 A1 | 5/2023 | Anbazhagan |
| 2024/0112179 A1* | 4/2024 | Vineyard, IV ...... G07F 17/3239 |
| 2024/0249588 A1 | 7/2024 | Shepherd |

OTHER PUBLICATIONS

Office Action (Non-Final Rejection) dated Dec. 8, 2022 for U.S. Appl. No. 17/443,738 (pp. 1-19).
Office Action (Non-Final Rejection) dated Dec. 12, 2022 for U.S. Appl. No. 17/443,745 (pp. 1-19).
Office Action (Notice of Allowance and Fees Due (PTOL-85)) dated Dec. 27, 2022 for U.S. Appl. No. 17/491,200 (pp. 1-13).
Office Action (Notice of Allowance and Fees Due (PTOL-85)) dated Jan. 19, 2023 for U.S. Appl. No. 17/491,200 (pp. 1-2).
Office Action (Non-Final Rejection) dated Feb. 21, 2023 for U.S. Appl. No. 17/491,291 (pp. 1-24).
Office Action (Non-Final Rejection) dated Mar. 15, 2023 for U.S. Appl. No. 17/491,523 (pp. 1-29).
Office Action (Final Rejection) dated Mar. 24, 2023 for U.S. Appl. No. 17/443,745 (pp. 1-11).
Office Action (Notice of Allowance and Fees Due (PTOL-85)) dated Apr. 13, 2023 for U.S. Appl. No. 17/491,200 (pp. 1-7).
Office Action (Final Rejection) dated Apr. 20, 2023 for U.S. Appl. No. 17/443,738 (pp. 1-13).
Notice of Allowance dated Apr. 13, 2023 for U.S. Appl. No. 17/491,200 (pp. 1-7).
Office Action (Non-Final Rejection) dated Jun. 14, 2023 for U.S. Appl. No. 17/491,528 (pp. 1-9).
Office Action (Non-Final Rejection) dated Jul. 3, 2024 for U.S. Appl. No. 17/443,738 (pp. 1-15).
Office Action (Non-Final Rejection) dated Aug. 12, 2024 for U.S. Appl. No. 18/468,405 (pp. 1-8).
Office Action (Final Rejection) dated Feb. 14, 2024 for U.S. Appl. No. 17/443,738 (pp. 1-14).
Office Action (Final Rejection) dated May 9, 2024 for U.S. Appl. No. 17/491,291 (pp. 1-15).
Office Action (Notice of Allowance and Fees Due (PTOL-85)) dated Oct. 13, 2023 for U.S. Appl. No. 17/491,528 (pp. 1-8).
Office Action (Notice of Allowance and Fees Due (PTOL-85)) dated Oct. 24, 2023 for U.S. Appl. No. 17/443,745 (pp. 1-7).
Office Action (Non-Final Rejection) dated Dec. 5, 2023 for U.S. Appl. No. 17/491,291 (pp. 1-15).
Office Action (Notice of Allowance and Fees Due (PTOL-85)) dated Dec. 19, 2023 for U.S. Appl. No. 17/491,528 (pp. 1-8).
Office Action (Notice of Allowance and Fees Due (PTOL-85)) dated Jun. 23, 2023 for U.S. Appl. No. 17/809,844 (pp. 1-9).
Office Action (Final Rejection) dated Jul. 27, 2023 for U.S. Appl. No. 17/491,291 (pp. 1-31).
Office Action (Non-Final Rejection) dated Jul. 28, 2023 for U.S. Appl. No. 17/443,745 (pp. 1-7).
Office Action (Non-Final Rejection) dated Sep. 7, 2023 for U.S. Appl. No. 17/443,738 (pp. 1-14).
Office Action (Final Rejection) dated Sep. 22, 2023 for U.S. Appl. No. 17/491,523 (pp. 1-37).
Office Action (Notice of Allowance and Fees Due (PTOL-85)) dated Sep. 30, 2024 for U.S. Appl. No. 17/491,291 (pp. 1-9).
Office Action (Non-Final Rejection) dated Oct. 7, 2024 for U.S. Appl. No. 17/958,109 (pp. 1-21).
Office Action (Notice of Allowance and Fees Due (PTOL-85)) dated Nov. 21, 2024 for U.S. Appl. No. 17/491,291 (pp. 1-8).
Office Action (Notice of Allowance and Fees Due (PTOL-85)) dated Nov. 27, 2024 for U.S. Appl. No. 18/468,405 (pp. 1-9).

* cited by examiner

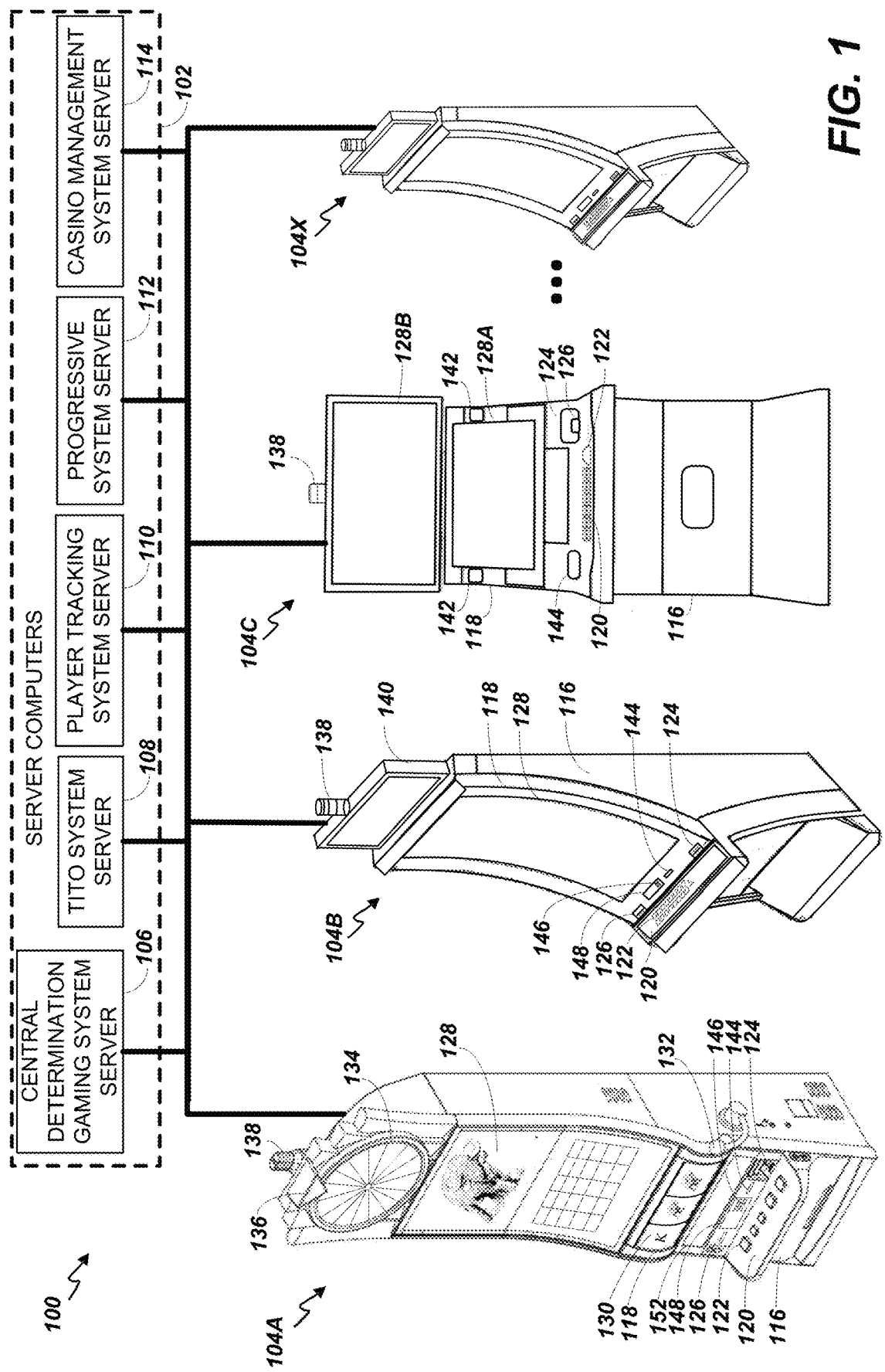

ELECTRONIC ACCOUNT TRANSFERS IN CASINO ENVIRONMENTS

TECHNICAL FIELD

The field of disclosure relates generally to electronic gaming, and more specifically, to systems and methods for electronic account transfers in casino environments.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

In markets where casino enterprise properties are within proximity of each other, because of regulation and jurisdictional requirements, today's wallet architectures require cash balances (e.g., casino wagering accounts) to remain at each casino site/property. If that same player has a balance at one casino location and travels to another casino site, the player will have to first log back into the first casino site to transfer money to an external funding provider. For example, if a player gambles at casino A, leaves casino A, and heads over next door to casino B, the player would need to manually transfer money from casino A to an external funding provider. After the transfer to the external funding provider, the player would need to transfer the balance from the external funding provider into a casino wagering account associated with the new property (e.g., casino B) where the player wants to fund gameplay. Thus, there is a need to provide a more seamless user experience where patron wallet balances are easily accessible across multiple properties while complying with gaming regulations across a variety of jurisdictional regions.

BRIEF DESCRIPTION

In one aspect, an electronic gaming system is described. The electronic gaming system includes at least one memory device with instructions stored thereon and at least one processor in communication with a plurality of electronic gaming devices and the at least one memory device. The instructions, when executed by the at least one processor, cause the at least one processor to receive digital wallet registration data from a wallet broker computer system wherein the digital wallet registration data is associated with a digital wallet and includes a digital wallet ID, determine that the digital wallet registration data is associated with a first player account stored at the at least one memory device, and store a digital wallet flag and the digital wallet ID in the first player account wherein the digital wallet flag indicates that the first player account is associated with the digital wallet. The instructions also cause the at least one processor to, upon receipt of player data based on a card-in event associated with the first player account at a respective electronic gaming device of a respective electronic gaming property including at least one of a first electronic gaming device at a first electronic gaming property or a second electronic gaming device at a second electronic gaming property, determine that the player data is associated with the first player account based on the player data, determine that the digital wallet flag is stored in the first player account, and cause access to the digital wallet to be provided at the respective electronic gaming device.

In another aspect, at least one non-transitory computer-readable storage medium with instructions stored thereon is described. The instructions, in response to execution by at least one processor, cause the at least one processor to receive digital wallet registration data from a wallet broker computer system, wherein the digital wallet registration data is associated with a digital wallet and includes a digital wallet ID, determine that the digital wallet registration data is associated with a first player account, and store a digital wallet flag and the digital wallet ID in the first player account, wherein the digital wallet flag indicates that the first player account is associated with the digital wallet. The instructions also cause the at least one processor to, upon receipt of player data based on a card-in event associated with the first player account at a respective electronic gaming device of a respective electronic gaming property including at least one of a first electronic gaming device at a first electronic gaming property or a second electronic gaming device at a second electronic gaming property, determine that the player data is associated with the first player account based on the player data, determine that the digital wallet flag is stored in the first player account, and cause access to the digital wallet to be provided at the respective electronic gaming device.

In yet another aspect, a method for electronic account transfers in casino environments implemented by at least one processor in communication with at least one memory is described. The method includes receiving digital wallet registration data from a wallet broker computer system wherein the digital wallet registration data is associated with a digital wallet and includes a digital wallet ID, determining that the digital wallet registration data is associated with a first player account, and storing a digital wallet flag and the digital wallet ID in the first player account wherein the digital wallet flag indicates that the first player account is associated with the digital wallet. The method also includes, upon receipt of player data based on a card-in event associated with the first player account at a respective electronic gaming device of a respective electronic gaming property including at least one of a first electronic gaming device at a first electronic gaming property or a second electronic gaming device at a second electronic gaming property, determining that the player data is associated with the first player account based on the player data, determining that the digital wallet flag is stored in the first player account, and causing access to the digital wallet to be provided at the respective electronic gaming device.

In one aspect, an electronic gaming system is described. The electronic gaming system includes at least one memory device with instructions stored thereon and at least one processor in communication with a plurality of electronic gaming devices and the at least one memory device. The instructions, when executed by the at least one processor, cause the at least one processor to determine that a player account is identified at an electronic gaming device, of the plurality of electronic gaming devices, at a first property wherein the player account is associated with a player and identify a player wallet account and a first localized wallet account associated with the player wallet account, the player, and the first property based upon the player account. The instructions also cause the at least one processor to determine that a balance flag associated with a second localized wallet account associated with the player wallet account, the player, and a second property is stored in the at least one memory device wherein the balance flag indicates a balance remaining in the second localized wallet account, and wherein the first property is a current location of the player and the second property is a previous location of the player and transfer the balance from the second localized wallet account to the first localized wallet account wherein the balance is available at the electronic gaming device upon completion of the transfer.

In another aspect, at least one non-transitory computer-readable storage medium with instructions stored thereon is described. The instructions, in response to execution by at least one processor, cause the at least one processor to determine that a player account is identified at an electronic gaming device, of a plurality of electronic gaming devices, at a first property wherein the player account is associated with a player and identify a player wallet account and a first localized wallet account associated with the player wallet account, the player, and the first property based upon the player account. The instructions also cause the at least one processor to determine that a balance flag associated with a second localized wallet account associated with the player wallet account, the player, and a second property is stored, wherein the balance flag indicates a balance remaining in the second localized wallet account, and wherein the first property is a current location of the player and the second property is a previous location of the player and transfer the balance from the second localized wallet account to the first localized wallet account, wherein the balance is available at the electronic gaming device upon completion of the transfer.

In yet another aspect, a method for electronic account transfers in casino environments implemented by at least one processor in communication with at least one memory is described. The method includes determining that a player account is identified at an electronic gaming device, of a plurality of electronic gaming devices, at a first property wherein the player account is associated with a player and identifying a player wallet account and a first localized wallet account associated with the player wallet account, the player, and the first property based upon the player account. The method also includes determining that a balance flag associated with a second localized wallet account associated with the player wallet account, the player, and a second property is stored, wherein the balance flag indicates a balance remaining in the second localized wallet account, and wherein the first property is a current location of the player and the second property is a previous location of the player and transferring the balance from the second localized wallet account to the first localized wallet account, wherein the balance is available at the electronic gaming device upon completion of the transfer.

BRIEF DESCRIPTION OF THE DRAWINGS

FIG. 1 is an exemplary diagram showing several EGMs networked with various gaming related servers.

DETAILED DESCRIPTION

Figure 2A:
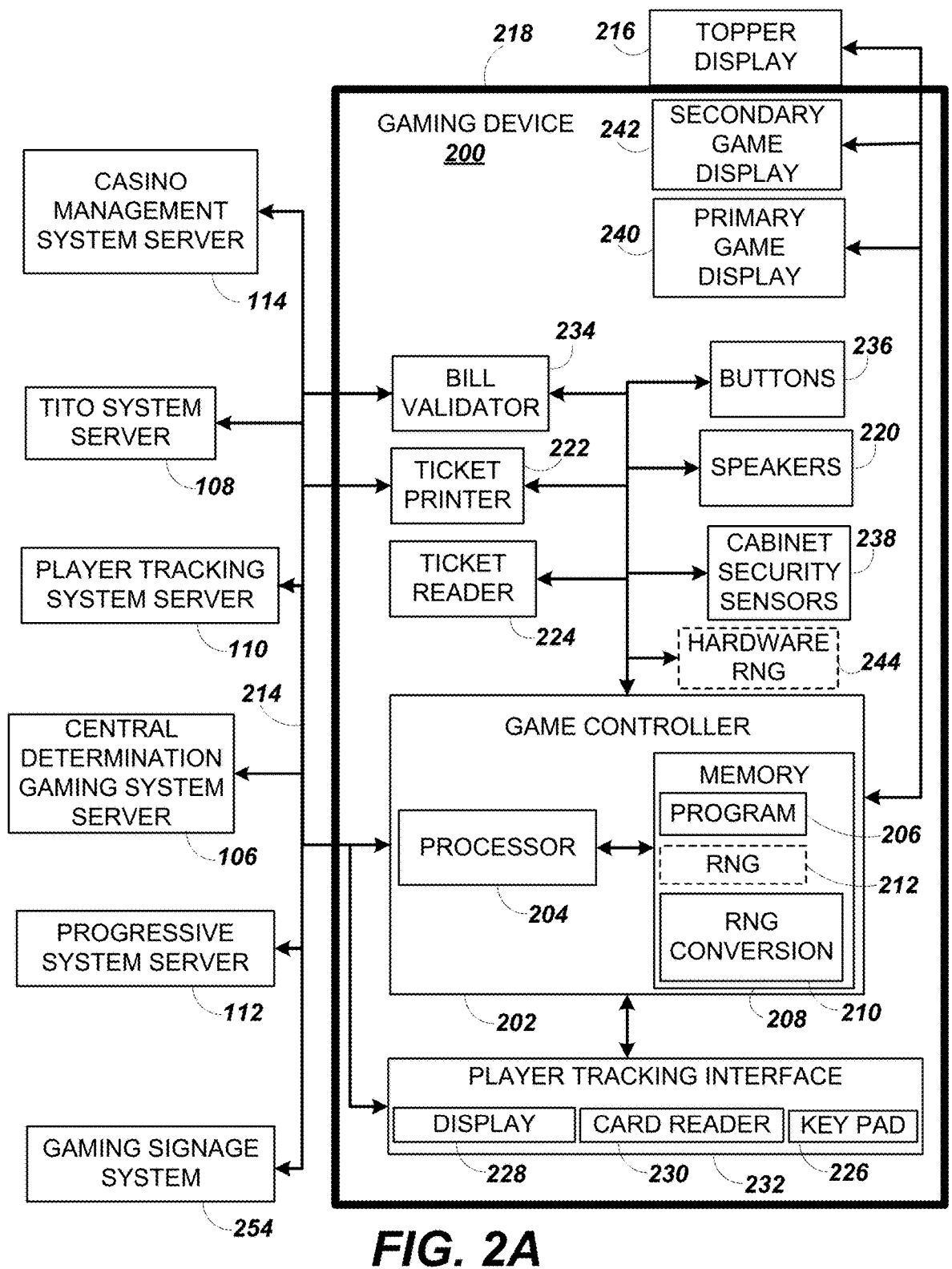
FIG. 2A is a block diagram showing various functional elements of an exemplary EGM.

Systems and methods for electronic account transfers in casino environments are described herein. In the example embodiment, an improved digital wallet architecture is provided. For example, the architecture links a wallet registration process to a player loyalty/account management system. Specifically, a multi-site player account management (PAM) system (e.g., for multiple sites, such as casino properties) manages transmission of player-related and wallet-related data. Thus, the multi-site PAM system acts as connector between different properties in a region and/or across multiple regions. By connecting player-related and wallet-related data across different locations, funds across different properties that are typically managed using multiple casino accounts/wallets can now seamlessly be used at multiple properties.

For example, by utilizing the systems and methods described herein, a player wallet balance is easily accessible from all properties under a same corporation and/or jurisdictional region. A premise of the design is to provide a seamless experience to players that allows them to be agnostic of multiple wallets and to enhance user experience by players not worrying about manually uploading cash amounts to a wallet before moving to another property. Accordingly, the multi-site PAM system acts as connector between different properties.

In the example embodiment described herein, the multi-site PAM system connects different properties associated with the same corporation (e.g., an electronic gaming company/casino enterprise). In some embodiments, the multi-site PAM system may connect different properties associated with different corporations.

In one example, the multi-site PAM system is configured to receive digital wallet registration data from a wallet broker (e.g., a wallet broker associated with a wallet system) wherein the digital wallet registration data is associated with a digital wallet (e.g., a first player wallet account) and includes a digital wallet ID. For example, the multi-site PAM system may receive digital wallet registration data from the wallet broker wherein the digital wallet registration data is generated by the wallet system in response to a request from an end user device associated with the first player account (e.g., a first player associated with a first player account registers for a digital wallet from his or her mobile device).

The multi-site PAM system may then determine that the digital wallet registration data is associated with a first player account stored at the at least one memory device and store a digital wallet flag and the digital wallet ID in the first player account wherein the digital wallet flag indicates that the first player account is associated with the digital wallet.

Accordingly, upon receipt of player data based on a card-in event associated with the first player account at a respective electronic gaming device of a respective electronic gaming property, the multi-site PAM system is configured to determine that the player data is associated with the first player account based on the player data, determine that the digital wallet flag is stored in the first player account, and cause access to the digital wallet to be provided at the respective electronic gaming device. For example, to cause access to the digital wallet to be provided at the respective electronic gaming device, the multi-site PAM system may transmit the digital wallet ID to a local PAM system associated with the respective electronic gaming property wherein in response to receiving the digital wallet ID, the local PAM system communicates with the wallet broker (e.g., wallet data, including a wallet balance associated with a balance of the digital wallet stored at the wallet system, is transmitted from the wallet broker to the local PAM system for use in a first player wallet account at the respective electronic gaming property).

Accordingly, the multi-site PAM system acts as connector between different properties by storing the registration data from the different properties as being associated with the same player account in the multi-site PAM system (e.g., while storing data (e.g., credit balances) associated with the player at the different properties separately, for example in a wallet system). For example, the multi-site PAM system may generate and store a unique identifier associated with the player account in order to track the PAM-level player account as being associated with separate localized wallet accounts for the same player at different properties.

It should be appreciated that electronic gaming devices may include player account management computing devices/servers associated with different electronic gaming establishments, in addition to other examples of gaming devices described herein.

To account for player inactivity, in some embodiments the multi-site PAM system is configured to receive player account activity data associated with the first player account from the local PAM system, determine that player account activity data satisfies an inactivity threshold including a number of days of inactivity, and inactivate the first player account based on the player account activity data satisfying the inactivity threshold.

To prevent duplicative player accounts being created for a corporation and associated with a digital wallet, in some embodiments the multi-site PAM system is configured to identify a second player account associated with the first player account, determine that first player account includes the digital wallet flag and the second player account does not include the digital wallet flag, and cause the second player account to merge into the first player account.

The systems and methods described herein provide many technical solutions to particular technical problems in the technical field of electronic gaming. In one or more designs, a patron needs to pay to a casino wallet from an external wallet to create a local balance (e.g., in a localized wallet account for a casino). This local balance in other designs, unless manually uploaded to an external wallet, is not immediately available to the patron in other properties (even under the same corporation). For example, in certain digital wallet implementations, after a cash out event occurs at a gaming device, the funds managed/stored on the gaming device (e.g., and tracked by the credit meter) are sent to a casino wagering account/local balance. The player would then need to manually transfer money from the casino wagering account to an external provider account in order to transfer that balance into a different casino wagering account.

In other words, in markets where casino enterprise properties are within proximity of each other, certain wallet architectures require cash balances (e.g., casino wagering accounts) to remain at each casino site/property. If that same player has a balance at one casino location and travels to another casino site, the player will have to first log back into the first casino site to transfer money to an external funding provider. For example, if a player gambles at casino A, leaves casino A, and heads over next door to casino B, the player would need to manually transfer money from casino A to an external funding provider. After the transfer to the external funding provider, the player would need to transfer the balance from the external funding provider into a casino wagering account associated with the new property (e.g., casino B) where the player wants to fund gameplay. Thus, there is a need to provide a more seamless user experience where the wallet balances are easily accessible across multiple properties while complying with gaming regulations in multiple jurisdictional regions.

Accordingly, technical solutions rooted in game funding technology are provided herein. The solutions allow balances to be automatically transferred between different casino sites (e.g., localized versions of a wallet account under a same corporation) while complying with gaming regulations.

In the example embodiment described herein, rather than the player manually transferring funds from a casino wagering account to an external provider, a PAM system, which may include a multi-site PAM system and/or multiple local PAM systems, and/or wallet API include improved functionality and capability that allows for the automatic transfer of funds between different casino wagering accounts and/or external funding providers without a player input manually specifying how to move funds across multiple localized wallet accounts. In doing so, the PAM system and/or wallet API can automatically provide and make available player funds without transferring those funds to an external funding provider while a player moves from casino to casino. It should be appreciated that the systems and methods described herein are envisioned as being applied to any property and/or region, and are not limited to gaming (e.g., casino) environments.

In other words, in the example embodiment, an improved digital wallet architecture that deploys a wallet broker at a multi-property level to allow for fund transfers between properties without involving an external credit provider is provided. For example, a wallet broker (e.g., an API wallet service) aggregates funds stored at multiple casino properties (e.g., in property/property-specific player accounts, such as localized wallet accounts) and external funding providers (e.g., financial service providers) and allows for the automatic transfer of funds between the different funding providers and/or localized wallet accounts based on the player's location (e.g., as determined by location tracking and/or player card-in at a gaming device, as examples).

As used herein, a wallet system may mean a virtual and/or physical space where digital assets (e.g., assets associated with electronic gaming) are stored and retrieved. A wallet broker may perform services and functionality that facilitate the transfer of funds (e.g., between a wallet system and a wallet account). In the example embodiment, the PAM system and/or wallet API causes a wallet broker to provide automatic fund transfers between localized wallet accounts. For example, the PAM system and/or wallet API may determine that a first player account is identified at an electronic gaming device at a first property (e.g., by receiving and analyzing a message from a device associated with the first property, such as a local PAM, based upon a card-in by the player at the electronic gaming device) wherein the first player account is associated with a player and the first property.

The PAM system and/or wallet API may then identify a first player wallet account and a first localized wallet account at the first property (e.g., a localized version of the first player wallet account) based upon the first player account and determine whether the first player wallet account is associated with a balance in a second localized wallet account (e.g., wherein second localized wallet account is associated with the player and a second property (e.g., a second localized version of the first player wallet account), as well as the same first player wallet account and universal wallet ID as the first localized wallet account). For example, the PAM system and/or wallet API may determine whether a flag is stored in memory and associated with the first player wallet account (e.g., "dirty" flags may be generated and stored when a gaming session ends at a device and a balance associated with a localized wallet account remains). For instance, a balance flag associated with the second localized wallet account and a second property may be identified, wherein the balance flag indicates a balance remaining in the second localized wallet account (e.g., wherein the first property is a current location of the player and the second property is a previous location of the player).

Based upon determining that the second localized wallet account includes a balance, the PAM system and/or wallet API may then transfer the balance from the second localized wallet account to the first localized wallet account such that upon completion of the transfer, the balance is available at the electronic gaming device at the first property. Accordingly, the balance is automatically transferred between the two localized wallet accounts (e.g., casino wagering accounts) based on a new location (e.g., at a new property under the same corporation) of a player and without the need to move the balance to an external funding provider (e.g., the PAM system and/or wallet API may, automatically upon detecting player presence at a new location, withdraw the balance from the second localized wallet account and deposit the balance in the first localized wallet account).

However, in some embodiments, an external funding provider may be utilized. For example, continuing the example described above, the PAM system and/or wallet API may transfer the balance from the second localized wallet account to an external provider account and then the balance may be transferred from the external provider account to the first localized wallet account.

In furtherance of the example above, the PAM system and/or wallet API may identify an updated balance in the first localized wallet account upon a game session ending at the electronic gaming device (e.g., based upon a message received from a device associated with the first property including data based upon a cash out occurring at the electronic gaming device). Based upon the game session ending, the PAM system and/or wallet API may generate and store a flag (e.g., at the local PAM system level) that indicates the updated balance is associated with the first localized wallet account.

Then, the PAM system and/or wallet API may determine that a third player account (e.g., associated with the player and the third property) is identified at a second electronic gaming device at a third property. The PAM system and/or wallet API may, accordingly, identify the first player wallet account and a third localized wallet account (e.g., a third localized version of the first player wallet account) based upon the third player account and determine that the first wallet player account is associated with the flag and the updated balance. Based upon determining the first player wallet account is associated with the flag, the PAM system and/or wallet API may transfer the updated balance from the first localized wallet account to the third localized wallet account such that upon completion of the transfer of the updated balance, the updated balance is available at the second electronic gaming device.

In some embodiments, the PAM system and/or wallet API may transfer the balance from the second localized wallet account to the first localized wallet account by withdrawing the balance from the second localized wallet account, selecting a provider type parameter identifying a funding type being the second localized wallet account (e.g., a casino wagering account), and depositing the balance in the first localized wallet account via a funding message including the provider type parameter.

As another example, in some embodiments the PAM system and/or wallet API may transfer the balance from the second localized wallet account to the first localized wallet account by transferring the balance from the second localized wallet account to an external provider account, selecting a provider type parameter identifying a funding type being the external provider account, and transferring the balance from the external provider account to the first localized wallet account via a funding message including the provider type parameter.

In some embodiments, the PAM system and/or wallet API may determine that the first localized wallet account is identified at an electronic gaming device at the first property by receiving and analyzing a message from a device associated with the first property based upon a card-in by the player at the electronic gaming device, wherein the message includes a provider name parameter based on a name of the first property.

In some embodiments, the PAM system and/or wallet API may only transfer balances across localized wallet accounts associated with properties in the same jurisdiction and/or corporation. For example, the PAM system and/or wallet API may determine that a first plurality of properties are in a first jurisdiction and transfer a first balance across the properties in the first jurisdiction, and determine that a second plurality of properties are in a second jurisdiction and transfer a second balance across the properties in the second jurisdiction. Continuing the example explained above, the PAM system and/or wallet API may determine that the first property and the second property are located in the same jurisdiction and, based upon determining that the second localized wallet account includes a balance and that the first property and the second property are located in the same jurisdiction, transfer the balance.

In some embodiments, the PAM system and/or wallet API may determine that the first player account is identified at the electronic gaming device based on a header included in a message, wherein in response to the header identifying no player account at that property, the PAM system and/or wallet API triggers a prompt to be displayed at the electronic gaming device allowing the player to create a player account associated with the first property.

As explained herein, in markets where casino enterprise properties are within proximity of each other, certain wallet architectures require cash balances (e.g., casino wagering accounts) to remain at each casino site/property (e.g., where the balances can only be transferred manually—for example, by first manually transferring a balance to an external provider and then manually from the external provider to a next localized wallet account). If that same player has a balance at one property (e.g., a first localized wallet account) and travels to a next property, the player has to first transfer the balance from the first property back to an external provider. After that transfer, the player would need to transfer the balance from the external provider into the next property (e.g., a second localized wallet account). For example, gaming regulations in some jurisdictions may require that funds only be transferred within a respective jurisdiction (e.g., to accurately track movement of money and to potentially avoid commingling of funds).

Accordingly, the present disclosure provides systems and methods for transferring balances across localized wallet accounts in a seamless, more efficient, and less manual manner. The PAM system and/or wallet API described herein are technically rooted in game funding technology that allows players to automatically transfer funds between different casino sites while complying with gaming regulations. In one digital wallet implementation, after a cash out event occurs, the funds managed/stored on a gaming device (e.g., tracked by a credit meter) are sent to a property/casino wagering account. The player would then need to manually transfer money from the property/casino wagering account to an external provider. As described herein, rather than the player manually transferring funds from a casino wagering account to an external provider, the PAM system and/or wallet API automatically transfers funds between different localized wallet accounts and/or external funding providers without any player input. By doing so, in the example embodiment the PAM system and/or wallet API provides and makes available player funds without transferring the funds to an external funding provider while a player moves from casino to casino.

Further, the PAM system and/or wallet API not only automatically transfers funds, but also accurately tracks movement of money using flags (e.g., balance flags) as described herein and avoids transferring of funds over different jurisdictions. Transferring of funds across jurisdictions violates gaming regulations and could violate other bodies of law (e.g., Federal Wire Act). Accordingly, because of unique gaming regulations and laws, existing wallet solutions are not acceptable. New wallet capabilities and/or wallet broker services, as described with respect to the PAM system and/or wallet API described herein, are needed to efficiently transfer funds across casinos.

Transfers herein may be electronic transfers, meaning electronic transfers to or from a game or gaming device of a player's cashable (or non-cashable) credits, through the use of a cashless wagering (or non-wagering) system, that have either been provided to the player, or for which the player has transmitted cash through a wagering (or non-wagering) account. The term also includes electronic transfers of money to a game or gaming device.

Further, the systems described herein may be cashless wagering systems, meaning the collective hardware, software, communications technology, and other associated equipment used to facilitate wagering (or non-wagering) on any game or gaming device including mobile gaming systems and interactive gaming systems with other than chips, tokens or legal tender of centralized banking institutions. The term may also include any race and sports computerized bookmaking system that accepts pari-mutuel wagers, or any other race and sports book systems that do not accept wagering instruments, wagering credits or process electronic transfers.

As used herein, a PAM system may include a combination of one or more local PAM systems and/or one or more multi-site PAM systems. For example, in some embodiments, a local PAM system monitors player activity at a specific casino or online casino. The local PAM system can include and/or manage a wallet account, or a wallet account can be separate from the local PAM (e.g., a separate service) and communicate with the local PAM. The multi-site PAM system communicates with the local PAM systems to check whether a player account is linked to a wallet database. The entire PAM system includes the local PAM system(s) and multi-site PAM system(s). Further, some functionalities described herein with respect to a multi-site PAM system may be performed, in some embodiments, by a wallet API and/or wallet broker separate from the PAM system (e.g., local and/or multi-site PAM systems) and vice-versa.

As used herein, wallet account may reference a plurality of types of accounts. For example, a wallet account may be a localized casino wagering account (e.g., referencing a land-based casino type account) as explained below in further detail. As another example, a wallet account may be a localized online wagering account (e.g., referencing an online-based gaming type account) to fund real money gaming online. Thus, wallet account as used herein may reference at least one of a localized casino wagering account or a localized online wagering account. In other words, a first player wallet account may be associated with a plurality of localized wallet accounts including localized casino wagering accounts and/or localized online wagering accounts. In some examples, the first player wallet account may be associated with a first casino enterprise (e.g., corporation). In some examples, a second player wallet account (e.g., including second localized casino wagering accounts and/or second localized online wagering accounts associated therewith) may be associated with the same player as the first player wallet account but a second casino enterprise.

Further, casino wagering account may mean electronic ledgers operated and maintained for a player in connection with the player's use and play of any or all authorized games and gaming devices, including, but not limited to, race books, sports pools, mobile gaming systems, and interactive gaming, wherein information relative to such use and play is recorded on behalf of the player including, but not limited to, the following types of transactions: deposits, withdrawals, debits, credits, service or other transaction-related charges authorized by the player, and adjustments to the wagering account.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
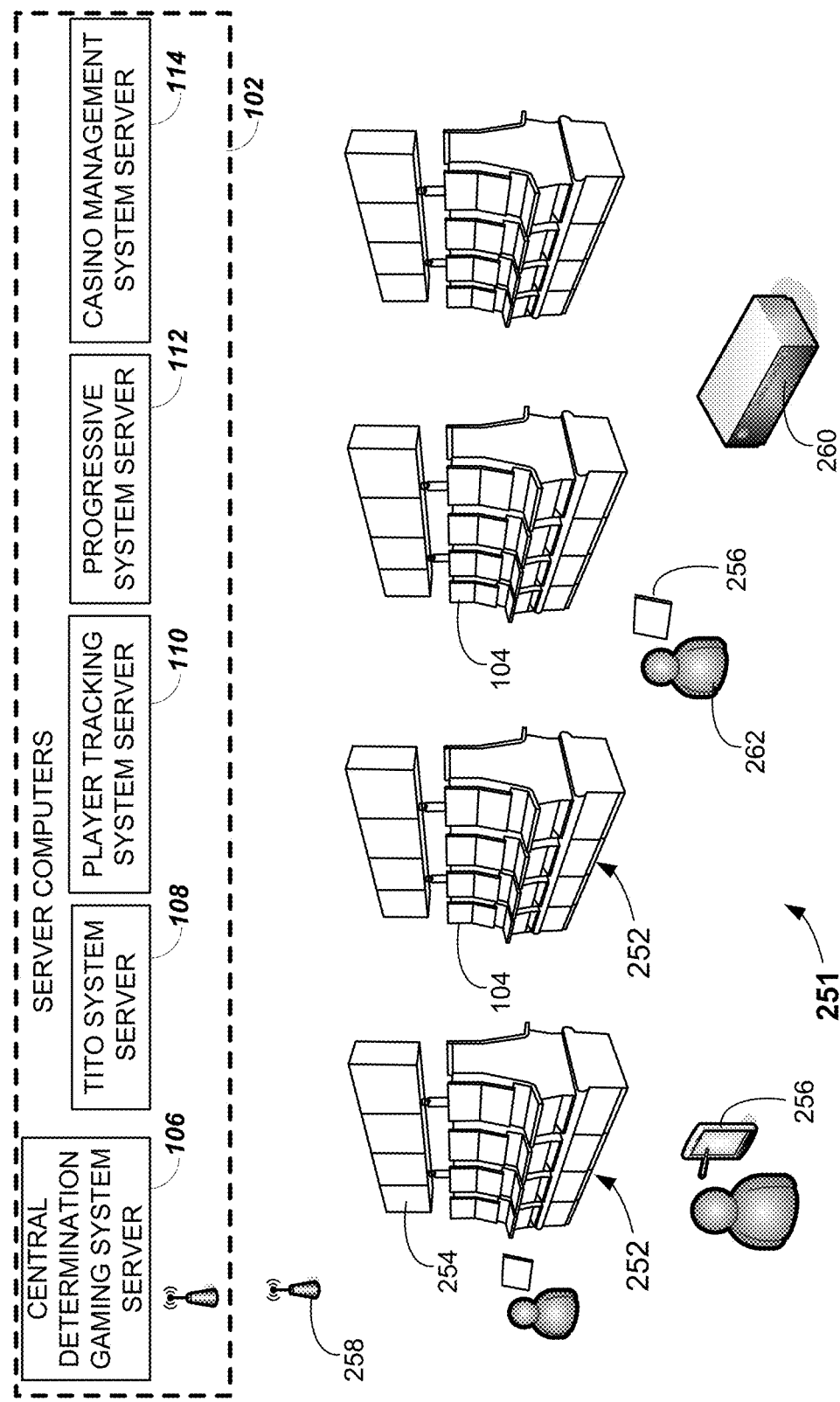
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
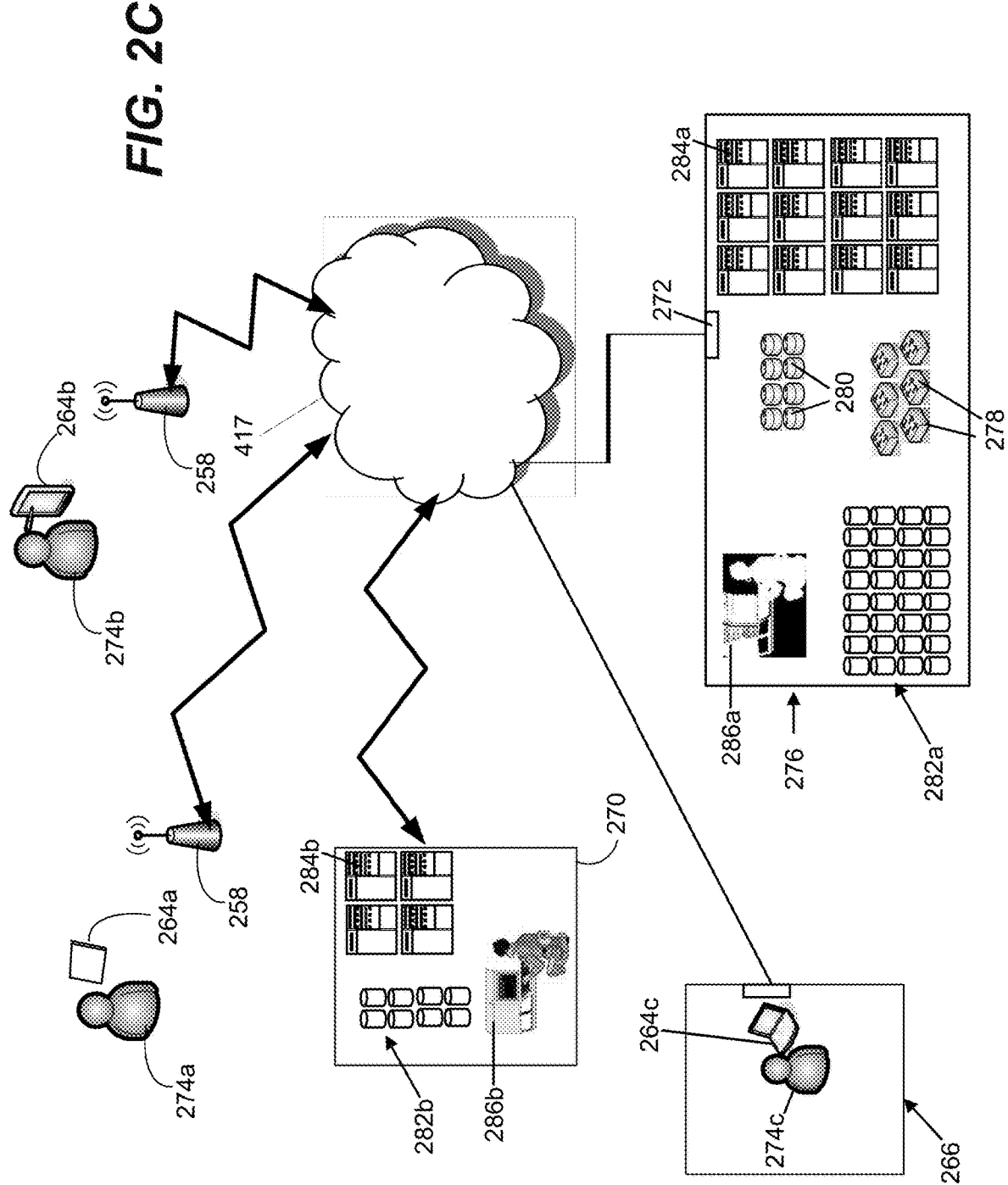
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264*a*, 264*b* and 264*c* are capable of communication via one or more networks 417. The networks 417 may, for example, include one or more cellular telephone networks, the Internet, etc. In this example, the EUDs 264*a* and 264*b* are mobile devices: according to this example the EUD 264*a* is a tablet device and the EUD 264*b* is a smart phone. In this implementation, the EUD 264*c* is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282*a*, servers 284*a* and one or more workstations 286*a*. The servers 284*a* may, for example, be configured to provide access to a library of games for online game play. In some examples, code for executing at least some of the games may initially be stored on one or more of the storage devices 282*a*. The code may be subsequently loaded onto a server 284*a* after selection by a player via an EUD and communication of that selection from the EUD via the networks 417. The server 284*a* onto which code for the selected game has been loaded may provide the game according to selections made by a player and indicated via the player's EUD. In other examples, code for executing at least some of the games may initially be stored on one or more of the servers 284*a*. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284*b*, storage devices 282*b*, and one or more workstations 286*b*. According to this example, the financial institution data center 270 is configured to maintain financial accounts, such as checking accounts, savings accounts, loan accounts, etc. In some implementations one or more of the authorized users 274*a*-274*c* may maintain at least one financial account with the financial institution that is serviced via the financial institution data center 270.

According to some implementations, the gaming data center 276 may be configured to provide online wagering games in which money may be won or lost. According to some such implementations, one or more of the servers 284*a* may be configured to monitor player credit balances, which may be expressed in game credits, in currency units, or in any other appropriate manner. In some implementations, the server(s) 284*a* may be configured to obtain financial credits from and/or provide financial credits to one or more financial institutions, according to a player's "cash in" selections, wagering game results and a player's "cash out" instructions. According to some such implementations, the server (s) 284*a* may be configured to electronically credit or debit the account of a player that is maintained by a financial institution, e.g., an account that is maintained via the financial institution data center 270. The server(s) 284*a* may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274*a*-274*c*), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
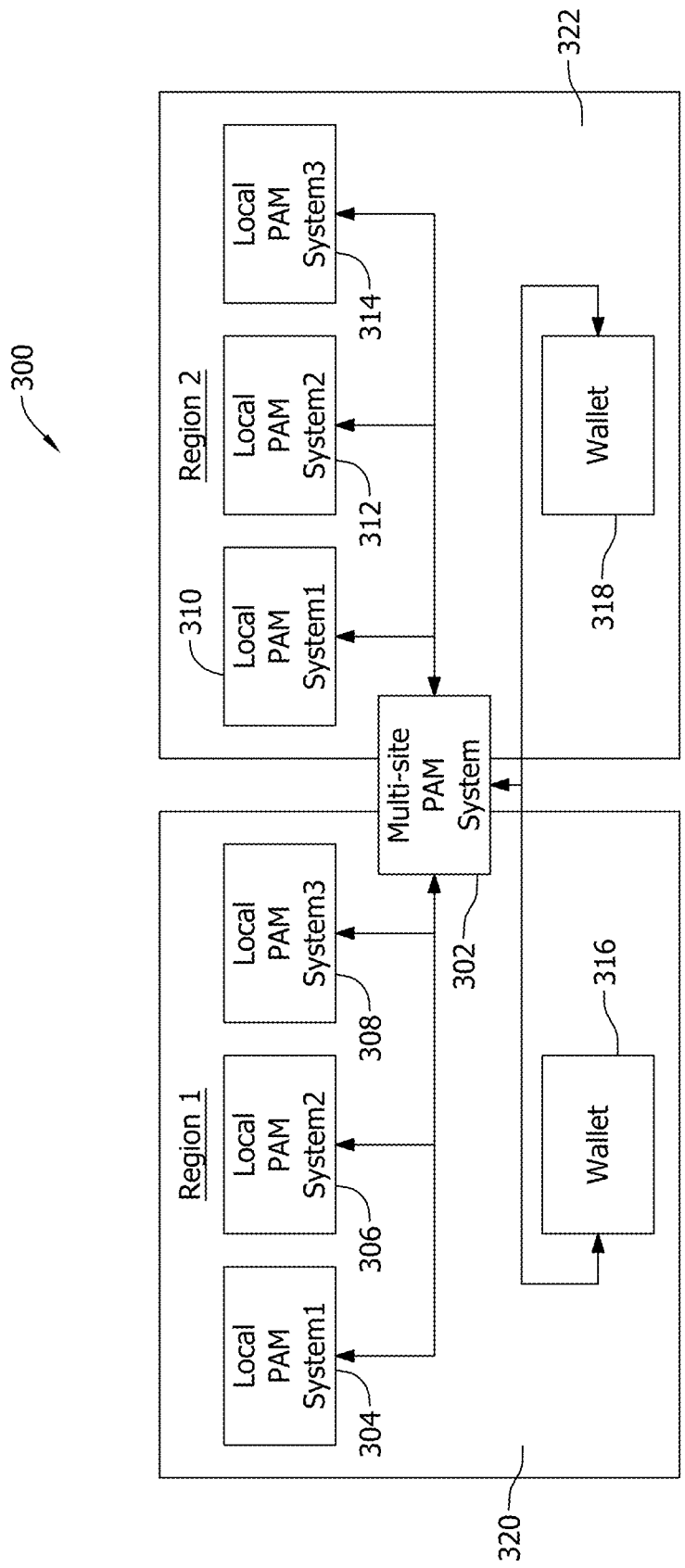
FIG. 3 illustrates an example multi-site electronic gaming system, in accordance with the present disclosure and in associated with, for example, the components shown in FIGS. 1-2C.

FIG. 3 illustrates an example multi-site electronic gaming system 300, in accordance with the present disclosure. As shown in FIG. 3, system 300 includes a multi-site PAM system 302 (e.g., a multi-site PAM) in communication with several single-site/local PAM systems 304-314. Each single-site/local PAM system 304-314 represents a PAM system at a casino property. In other words, local PAM system 304 is associated with a first property, local PAM system 306 is associated with a second property, and so forth (e.g., under the same casino enterprise).

For example, local PAM systems 304-314 may perform player tracking functions as described herein with respect to player tracking system server 110 (e.g., to track play, such as amount wagered, games played, time of play and/or other quantitative or qualitative measures for individual players at a respective location so that an operator of that location may reward players in a loyalty program). Different from local PAM systems 304-314, multi-site PAM system 302 stores certain flags (e.g., wallet flags) and data (e.g., wallet IDs) upon player wallet registration and communicates certain data to local PAM systems 304-314 upon player card-in events (e.g., to facilitate local PAM systems 304-314 gaining access to a digital wallet associated with a player). A wallet API may automatically transfer funds between different casino wagering accounts (e.g., associated with local PAM systems 304-314 and/or a same corporation), wallet brokers 316, 318 (e.g., associated with one or more wallet systems), and/or external funding providers automatically without requiring any player input. In doing so, multi-site PAM system 302 and/or wallet API can automatically provide and make available player funds while a player moves from casino to casino.

As described herein, multi-site PAM system 302 is also in communication with wallet brokers 316, 318. For example, wallet brokers 316, 318 may manage player wallets in respective jurisdictions by facilitating communication between wallet systems and multi-site PAM system 302. In some embodiments, wallet systems may be included in respective local PAM systems 304-314. In the example of FIG. 3, local PAM systems 304-308 are associated with (e.g., located in) a first jurisdiction 320 and local PAM systems 310-314 are associated with a second jurisdiction 322. In some embodiments, funds cannot be transferred between jurisdictions 320, 322 (e.g., because of regulation and/or legal requirements). In examples where funds cannot be transferred between jurisdictions 320, 322, multi-site PAM system 302 is responsible for facilitating the transfer of funds/credits across different properties within a specific region. In some embodiments, multi-site PAM system 302 is in communication with a message broker service such that when a wallet registration process occurs, the message broker service provides wallet information to multi-site PAM system 302 for storage.

In some embodiments, player registration may be initiated and processed by a wallet system associated with one of brokers 316, 318. The wallet system processes the request and on successful validation/creation, generates a player wallet and transmits wallet details via one of brokers 316, 318 (e.g., a wallet ID) to multi-site PAM system 302. Multi-site PAM system 302 saves at least some of the details (e.g., the wallet ID and/or a wallet flag) and transmits back acknowledgement to the wallet system via one of brokers 316, 318. The transmission of acknowledgement completes the registration.

Then, for example, upon a player card-in event at an establishment associated with one of local PAM systems 304-314, multi-site PAM system 302 supplies the stored player information/details to the appropriate local PAM system 304-314. For example, multi-site PAM system 302 stores an active wallet flag indicating whether a player has a digital wallet linked to a site associated with a local PAM system 304-314. Based on this flag status, a wallet API may be queried (e.g., via brokers 316, 318 by the appropriate local PAM system 304-314, in some embodiments via multi-site PAM system 302) for player and/or wallet information. In some embodiments, a respective wallet system associated with a respective local PAM system 304-314 may query a wallet broker 316, 318 rather than the respective local PAM system 304-314 itself.

Figure 4:
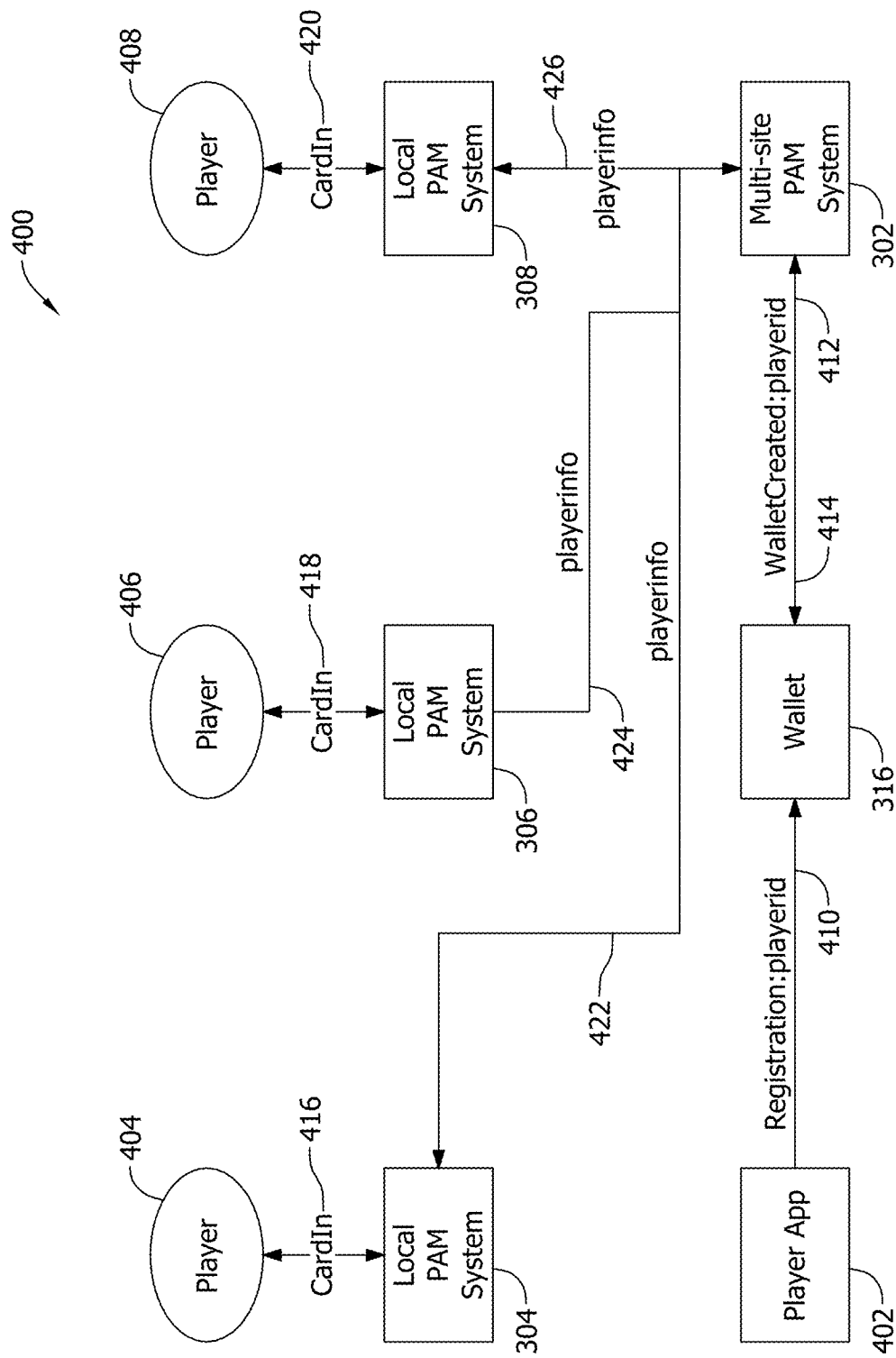
FIG. 4 illustrates another embodiment of the system shown in FIG. 3.

FIG. 4 illustrates a further embodiment 400 of system 300 (e.g., shown in FIG. 3). As shown in FIG. 4, embodiment 400 includes a player app 402 (e.g., implemented on a user device, such as a mobile device, associated with a player), broker 316, multi-site PAM system 302, local PAM systems 304-308, and example players 404-408.

Each player 404-408 may register 410 for a digital wallet account via player app 402. A wallet system associated with broker 316 processes the registration requests, creates the digital wallet accounts, and transmits 412 digital wallet account details to multi-site PAM system 302 via broker 316. Multi-site PAM system 302 records the digital wallet account details (e.g., and creates an active wallet flag) and transmits 414 a confirmation back to broker 316, completing the registration.

Then, upon card-in events 416-420 from players 404-408 detected by local PAM systems 304-308, local PAM systems 304-308 may request 422-426 details regarding respective players 404-408 from multi-site PAM system 302 and, based on the received details (e.g., indicating whether players 404-408 are associated with respective digital wallet accounts by, for example, use of an active wallet flag) local PAM systems 304-308 may query a digital wallet system via broker 316 (e.g., and/or via multi-site PAM system 302, in some embodiments) for digital wallet details, such as account balances, regarding respective players 404-408. In some embodiments, a wallet system may be included in a respective local PAM system 304-308.

Figure 5:
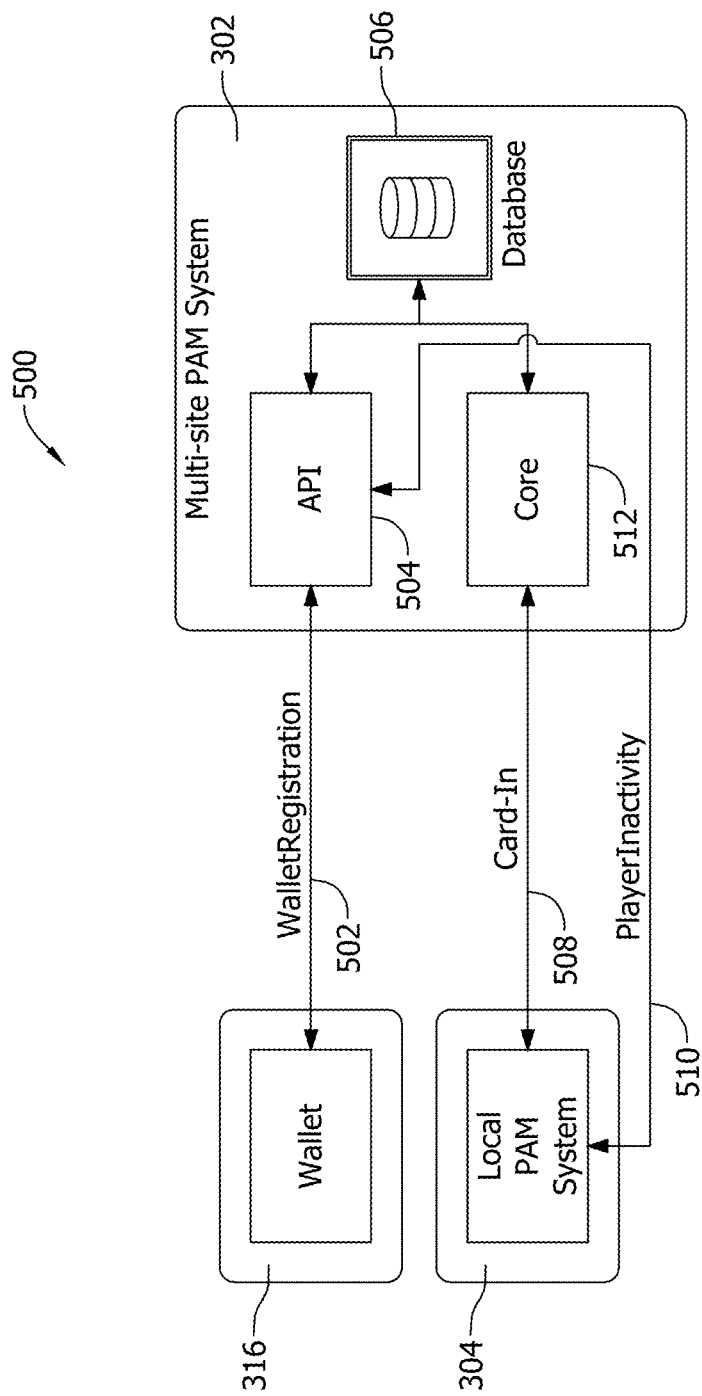
FIG. 5 illustrates another embodiment of the system shown in FIG. 3.

FIG. 5 illustrates a further embodiment 500 of system 300 (e.g., shown in FIG. 3). For example, FIG. 5 illustrates embodiment 500 integrating multi-site PAM system 302 with broker 316 (e.g., broker 316 may include an API that receives and/or requests wallet information associated with a player from a wallet system). As shown in FIG. 5, when a wallet registration 502 initiates, broker 316 passes wallet information (e.g., a wallet ID) to multi-site PAM system 302 for storage as part of the wallet registration process. Broker 316 passes the information via an API 504 and multi-site PAM system 302 stores the wallet data (e.g., the wallet ID) into a database 506. In the example embodiment, multi-site PAM system 302 also stores a wallet flag indicating the player is now associated with a digital wallet. Multi-site PAM system 302 then provides an acknowledgment to broker 316, indicating the wallet data store has been successful.

FIG. 5 also illustrates that when a player cards in (e.g., at an EGM in a specific casino), local PAM system 304 sends a request 508 for wallet information to multi-site PAM system 302. Multi-site PAM system 302 responds by providing (directly or indirectly) the stored wallet information (e.g., the wallet ID, based on the presence of the wallet flag) back to local PAM system 304. For example, after local PAM system 304 receives validation from multi-site PAM system 302 that the player has an active wallet, local PAM system 304 may request wallet information associated with the player (e.g., localized wallet account information from broker 316). In some embodiments, when no wallet flag is stored, multi-site PAM system 302 may transmit a message back to local PAM system 304 indicating that no digital wallet associated with the player has been created and/or is known by multi-site PAM system 302.

In some embodiments, multi-site PAM system 302 may also transmit player inactivity data 510 to local PAM system 304, as explained herein in more detail such as below with respect to FIG. 8A. In some embodiments, certain actions performed by multi-site PAM system 302 may be performed by a core services component 512 of multi-site PAM system 302. Further, in some embodiments, local PAM system 304 may transmit updated player tracking data associated with a player (e.g., gaming data based on game play at a site associated with local PAM system 304) to multi-site PAM system 302 for storage.

Figure 6A:
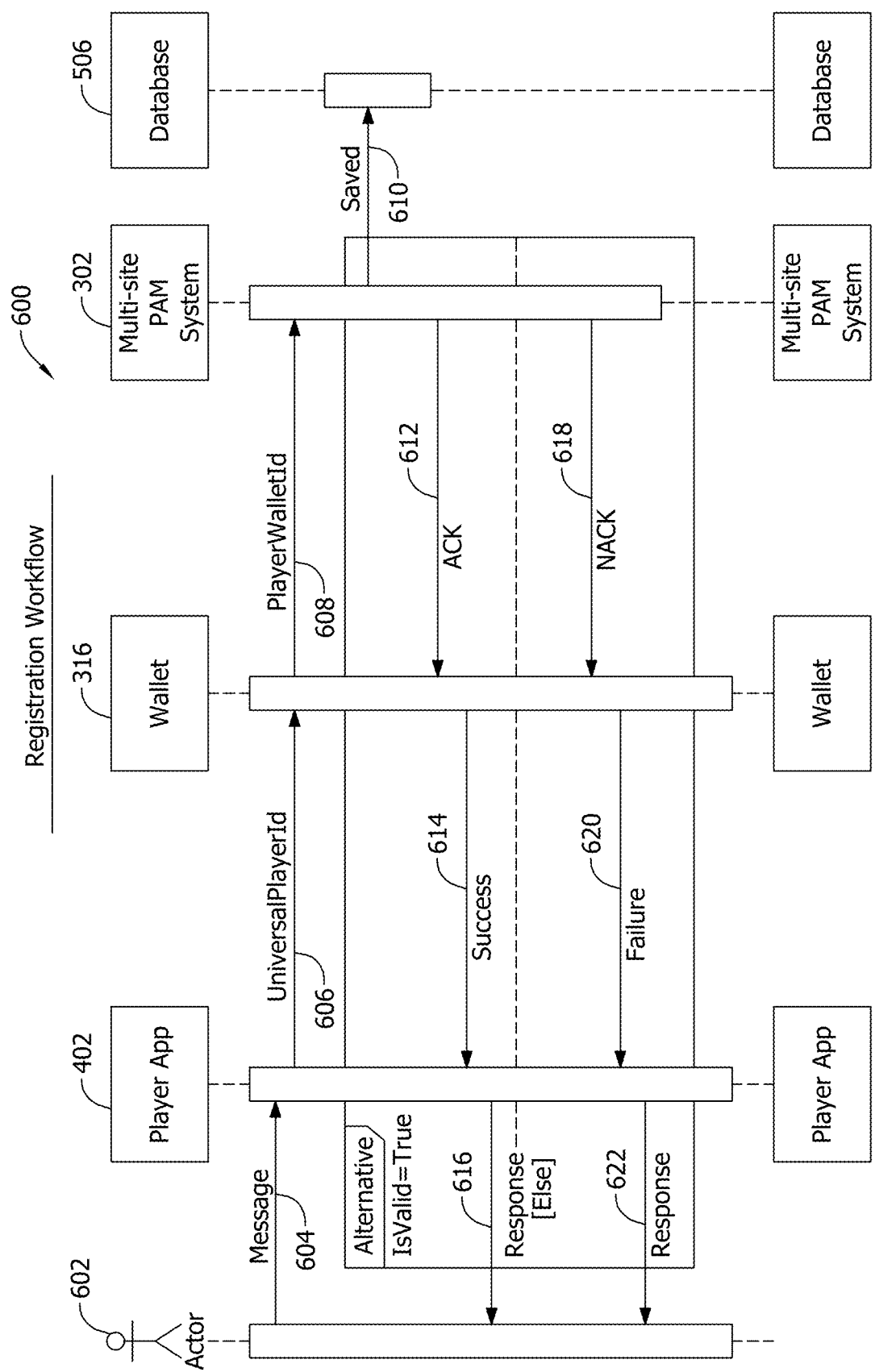
FIG. 6A illustrates an example registration process implemented by the system shown in FIG. 3.

FIG. 6A illustrates an example registration process 600 implemented by system 300. As shown in FIG. 6A, process 600 is implemented by a computing device 602 (e.g., a gaming device, a personal device, etc.), player app 402, wallet broker 316 (e.g., and a wallet system associated therewith), multi-site PAM system 302, and database 506.

In the example embodiment, process 600 begins with a player registration message 604 transmitted from device 602 to player app 402. App 402 then generates and transmits a universal ID 606 associated with a player at device 602 to broker 316. Broker 316 then causes a wallet system associated with broker 316 to generate a wallet ID 608 and transmits wallet ID 608 (e.g., an identifier of the wallet account associated with a player account of the player at device 602) to multi-site PAM system 302. Multi-site PAM system 302 then saves 610 wallet ID 608 and creates a flag in database 506 indicating that a player account of the player at device 602 is linked to a digital wallet (e.g., associated with wallet ID 608).

As explained herein, multi-site PAM system 302 may also determine whether a player associated with universal ID 606 and/or wallet ID 608 already has a player account at a certain establishment and/or corporation linked to a digital wallet (e.g., by comparing received data to data stored in database 506). If the player does not have an existing account at the establishment and/or corporation linked to a wallet account, multi-site PAM system 302 transmits an acknowledgement 612 to broker 316, which transmits a success message 614 to app 402, which responds 616 to device 602 indicating the success. Further, if the player does have an existing account at the establishment and/or corporation and linked to a wallet account, multi-site PAM system 302 transmits a non-acknowledgement message 618 to broker 316, which transmits a failure message 620 to app 402, which responds 622 to device 602 indicating the failure.

In some embodiments, as part of validating whether a player has an existing account at an establishment, multi-site PAM system 302 may utilize various received information and compare that information to data stored in database 506 (e.g., social security number (SSN), deceased indicator, inactive indicator, archived indicator, Dis-Associated Player (DAP) (e.g., meaning the player is excluded from gambling which can be due to multitude of reasons such as fraud, legal issues, self-choosing, etc. The DAP status may cause the PAM system to reject a player attempt to play or send the player and/or an admin warnings that an excluded player is trying to play/gamble).

Figure 6B:
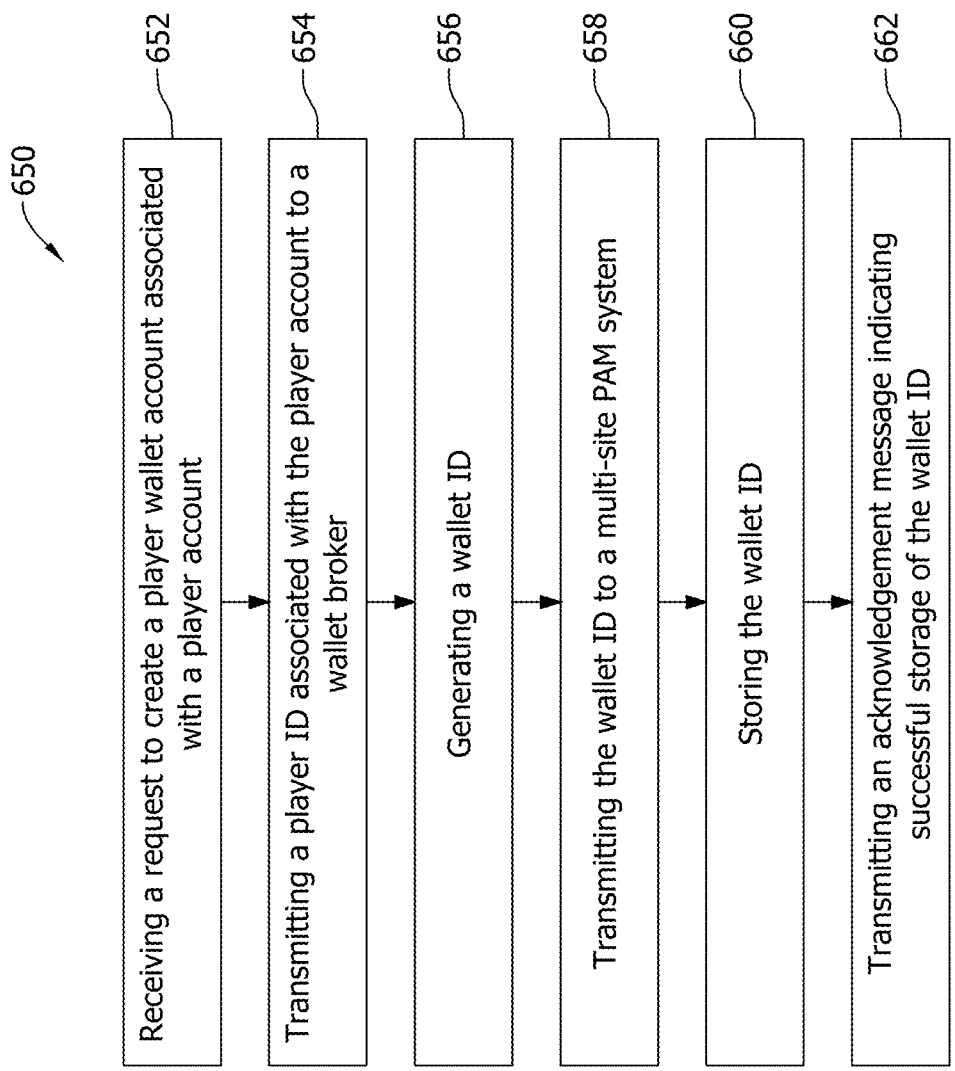
FIG. 6B illustrates an example method associated with the registration process shown in FIG. 6A.

FIG. 6B illustrates an example method 650 associated with registration process 600. In the example embodiment, method 650 includes receiving 652 a request to create a player wallet account associated with a player account and transmitting 654 a player ID associated with the player account to a wallet broker. Method 650 also includes generating 656 a wallet ID (e.g., a universal wallet ID) and transmitting 658 the wallet ID to a multi-site PAM system. Method 650 further includes storing 660 the wallet ID. In embodiments where the wallet ID is successfully stored (e.g., because no other player account associated with the same player is also associated with an existing player wallet account), method 650 includes transmitting 662 an acknowledgement message indicating successful storage of the wallet ID. In embodiments where the wallet ID is not successfully stored, method 650 includes transmitting a failure message indicating unsuccessful storage of the wallet ID.

Figure 7A:
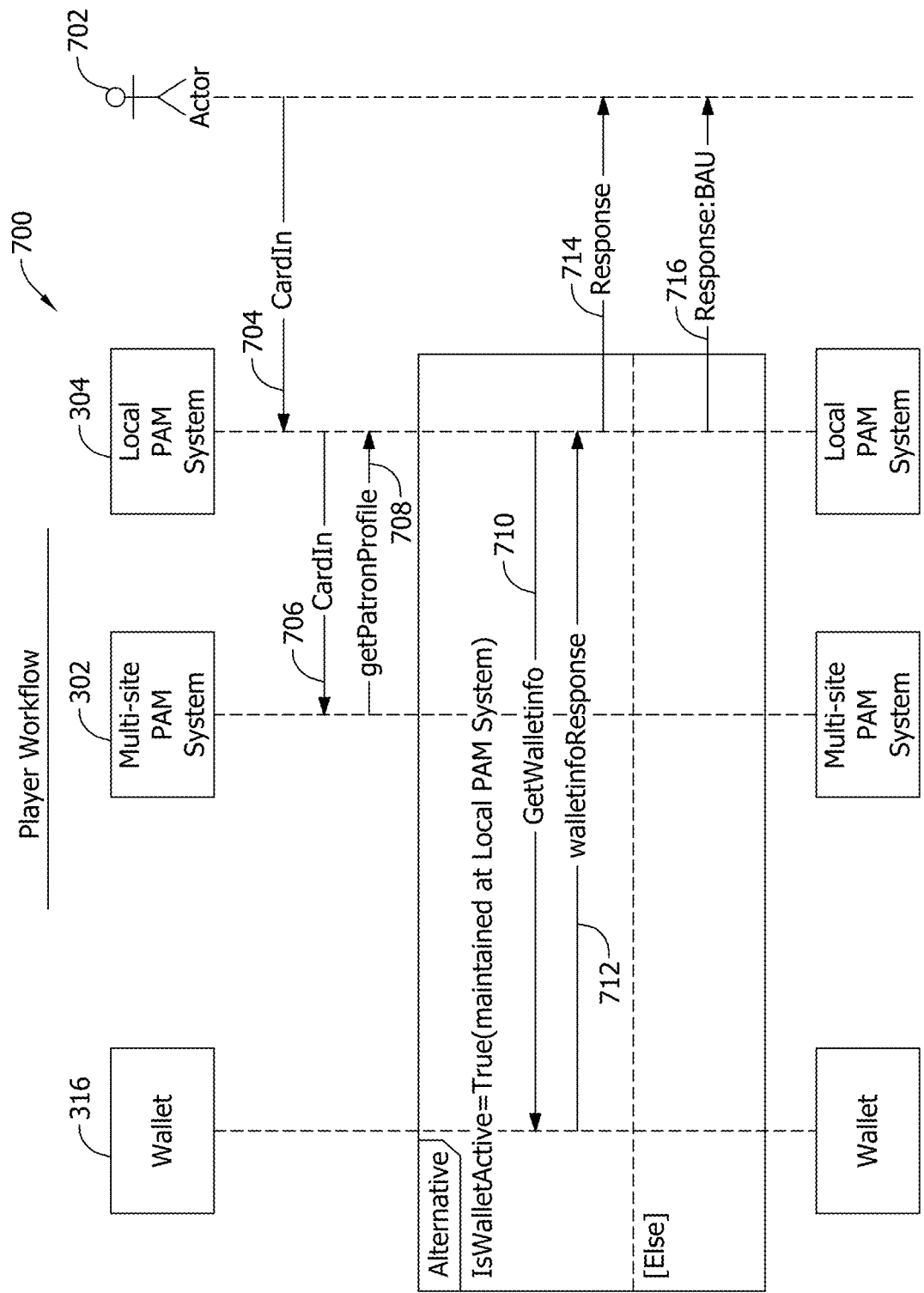
FIG. 7A illustrates an example player account card-in process implemented by the system shown in FIG. 3.

FIG. 7A illustrates an example player account card-in process 700 implemented by system 300. As shown in FIG. 7A, process 700 is implemented by broker 316, multi-site PAM system 302, local PAM system 304, and a device 702 (e.g., an electronic gaming device) associated with the same establishment as local PAM system 304.

During the digital wallet registration process, multi-site PAM system 302 stores a flag indicating that a wallet registration process occurs and that a player account is linked to a specific wallet account. In the example embodiment, process 700 includes a player card-in event detected at device 702. Accordingly, device 702 transmits a card-in message 704 to local PAM system 304. Local PAM system 304 passes at least a portion 706 of card-in message (e.g., player account data) to multi-site PAM system 302. Multi-site PAM system 302 then performs a lookup (e.g., in database 506 based on the player account data) and transmits a response message 708 indicating whether a player account associated with the player card-in is linked to a wallet account to local PAM system 304. If the player account is linked to a wallet account, message 708 includes a wallet ID.

In some embodiments, local PAM system 304 generates and transmits a wallet information request 710 (e.g., including the wallet ID) to broker 316. A wallet system associated with broker 316 performs a lookup for the requested wallet information and broker 316 transmits a response 712 (e.g., with a wallet balance) to local PAM system 304. Local PAM system 304 then sends either a success message 714 or a failure message 716 to device 702 based upon the response 712.

In some embodiments, device 702 may be configured to display different information based upon whether message 714 or message 716 was received. For example, upon receipt of message 714, device 702 may display certain player account information (e.g., loyalty information, a localized wallet account balance, etc.). Further, upon receipt of message 716, device 702 may display a prompt requesting a player at device 702 register for a player account and/or link their player account to a wallet account.

By storing a flag at multi-site PAM system 302 and having local PAM system 304 obtain other wallet information from broker 316, the integration process allows for: (1) having a single-source of truth for the wallet information and (2) avoids creating duplicative messages. Having multi-site PAM system 302 store some or a copy of the wallet information could cause store duplicative data and/or unnecessary messaging to verify and confirm data stored in multi-site PAM system 302 matches data stored at broker 316. Accordingly, in the example embodiment, multi-site PAM system 302 stores a wallet ID and a wallet flag upon creation/registration of a digital wallet and acts as connector between different properties.

Figure 7B:
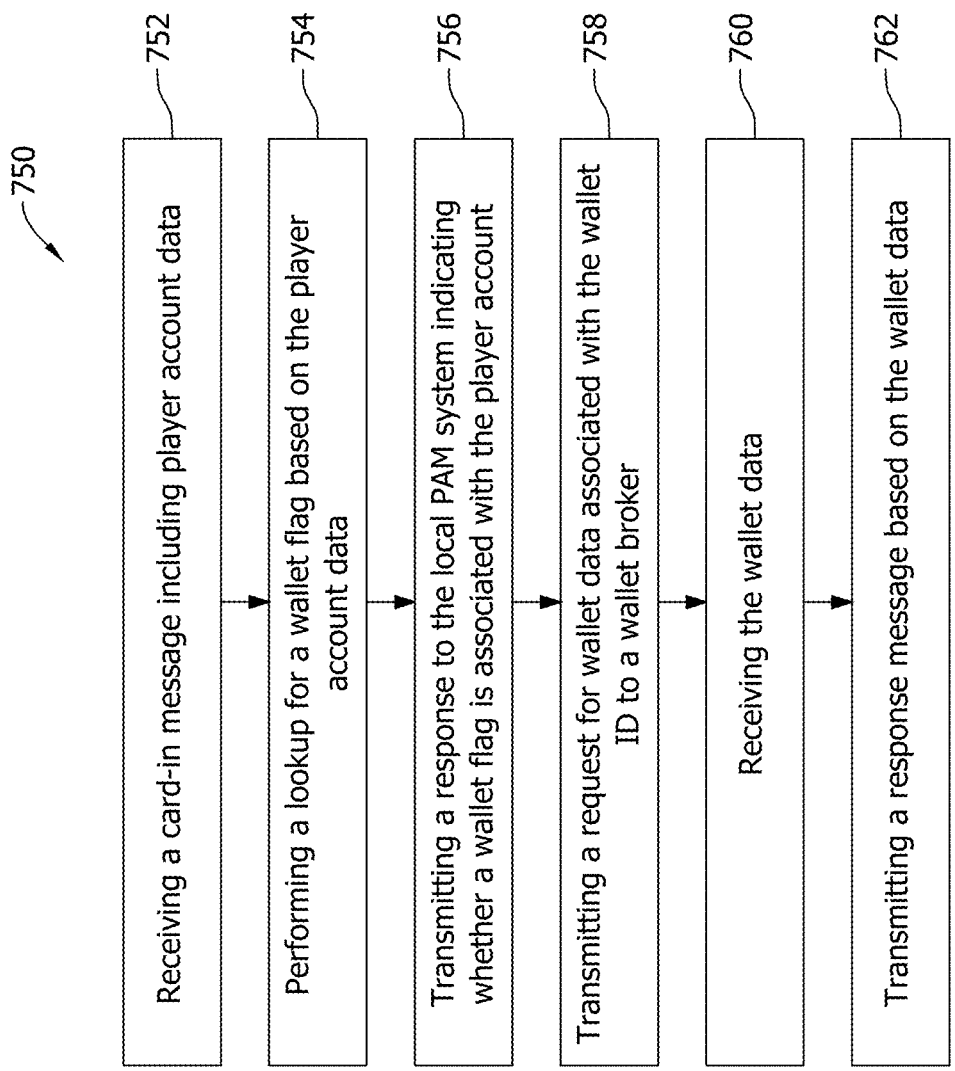
FIG. 7B illustrates an example method associated with the card-in process shown in FIG. 7A.

FIG. 7B illustrates an example method 750 associated with player account card-in process 700. In the example embodiment, method 750 includes receiving 752 a card-in message including player account data associated with a player account from a local PAM system and performing 754 a lookup for a wallet flag based on the player account data. Method 750 also includes transmitting 756 a response to the local PAM system indicating whether a wallet flag is associated with the player account. In embodiments where a wallet flag is associated with the player account, the response may include a wallet ID. Accordingly, in embodiments where a wallet flag is associated with the player account, method 750 includes transmitting 758 a request for wallet data associated with the wallet ID to a wallet broker and receiving 760 the wallet data. Method 750 further includes transmitting 762 a response message based on (e.g., including) the wallet data.

Figure 8A:
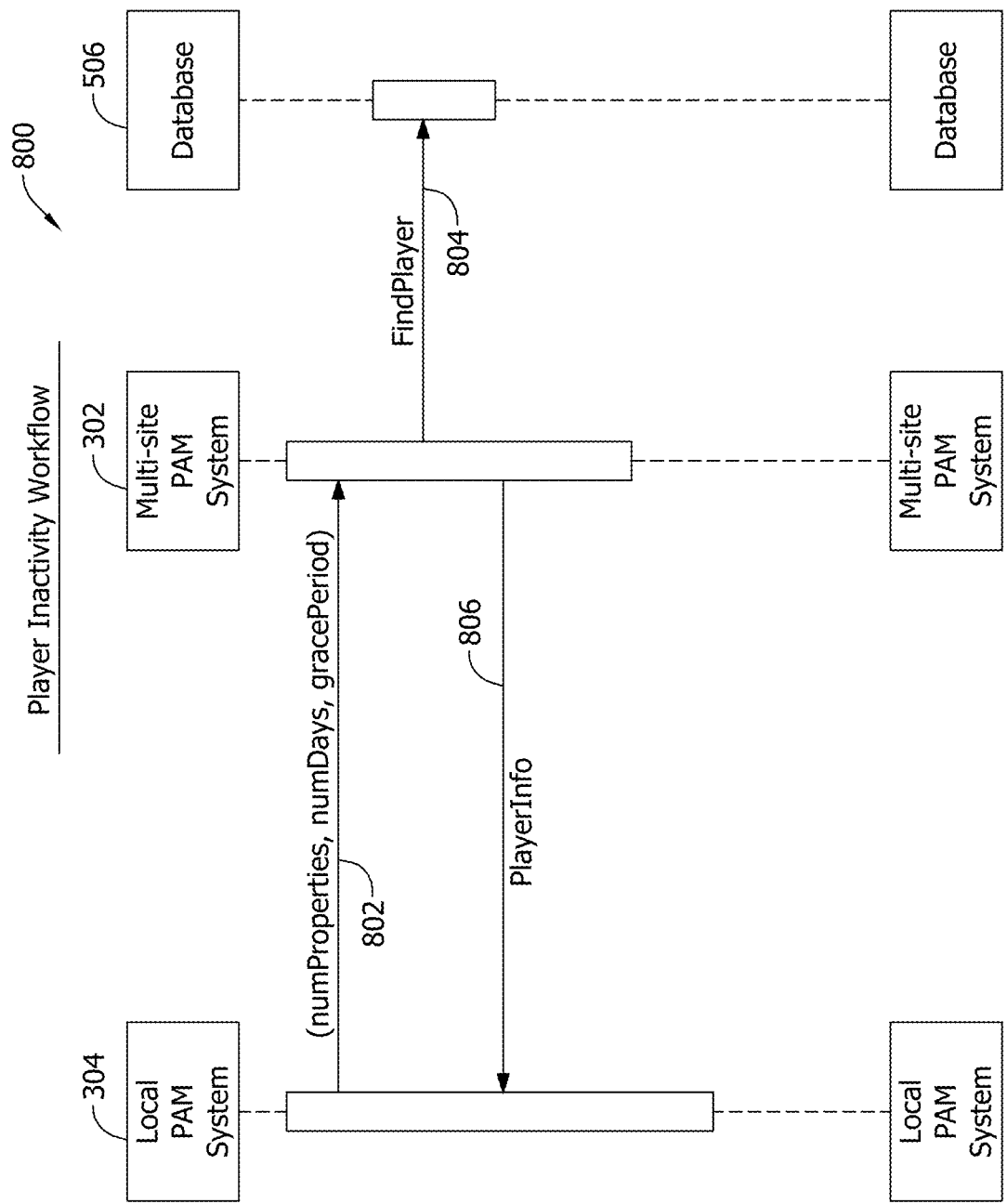
FIG. 8A illustrates an example player account inactivity process implemented by the system shown in FIG. 3.

FIG. 8A illustrates an example player account inactivity process 800 implemented by system 300. As shown in FIG. 8A, process is implemented by local PAM system 304, multi-site PAM system 302, and database 506.

In the example embodiment, process 800 includes local PAM system 304 generating and transmitting a player information request 802 to multi-site PAM system 302. For example, request 802 may include a property code associated with a property associated with local PAM system 304 (e.g., or multiple codes associated with multiple properties), a number of days of player inactivity, and/or a grace period (e.g., additional time after duration of inactivity). Request 802 may request multi-site PAM system 302 determine and send back to local PAM system 304 which player accounts satisfy the criteria included in the request (e.g., a threshold number of days of inactivity). Accordingly, multi-site PAM system 302 determines which player accounts satisfy the inactivity criteria (e.g., which accounts are "inactive" for that property) based upon data 804 requested and received from database 506. Multi-site PAM system 302 then transmits player information 806 to local PAM system 304 (e.g., information, such as player account IDs, associated with accounts identified as inactive based upon request 802).

Figure 8B:
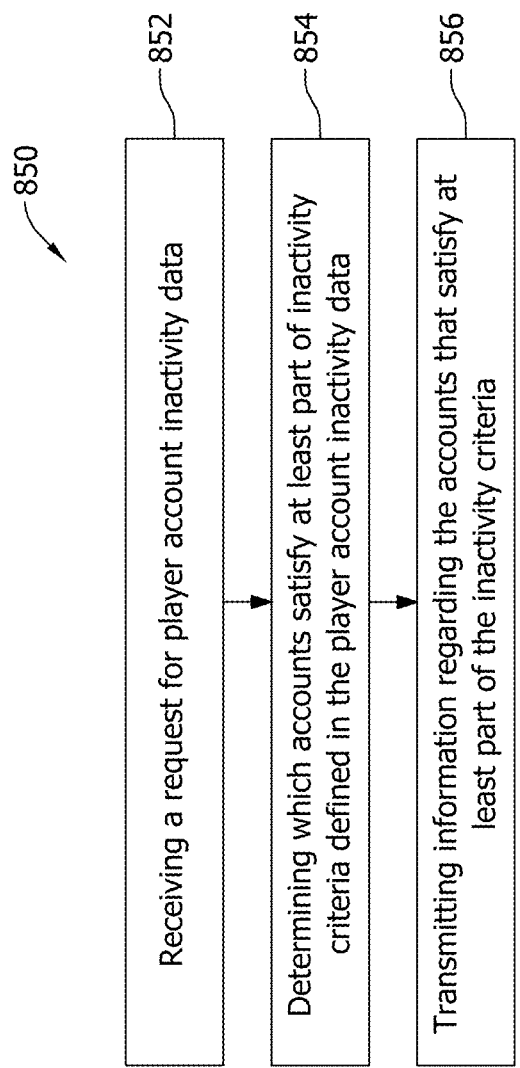
FIG. 8B illustrates an example method associated with the player account inactivity process shown in FIG. 8A.

FIG. 8B illustrates an example method 850 associated with player account inactivity process 800. In the example embodiment, method 850 includes receiving 852 a request for player account inactivity data, determining 854 which accounts satisfy at least part of inactivity criteria defined in the player account inactivity data, and transmitting 856 information regarding the accounts that satisfy at least part of the inactivity criteria.

Figure 9A:
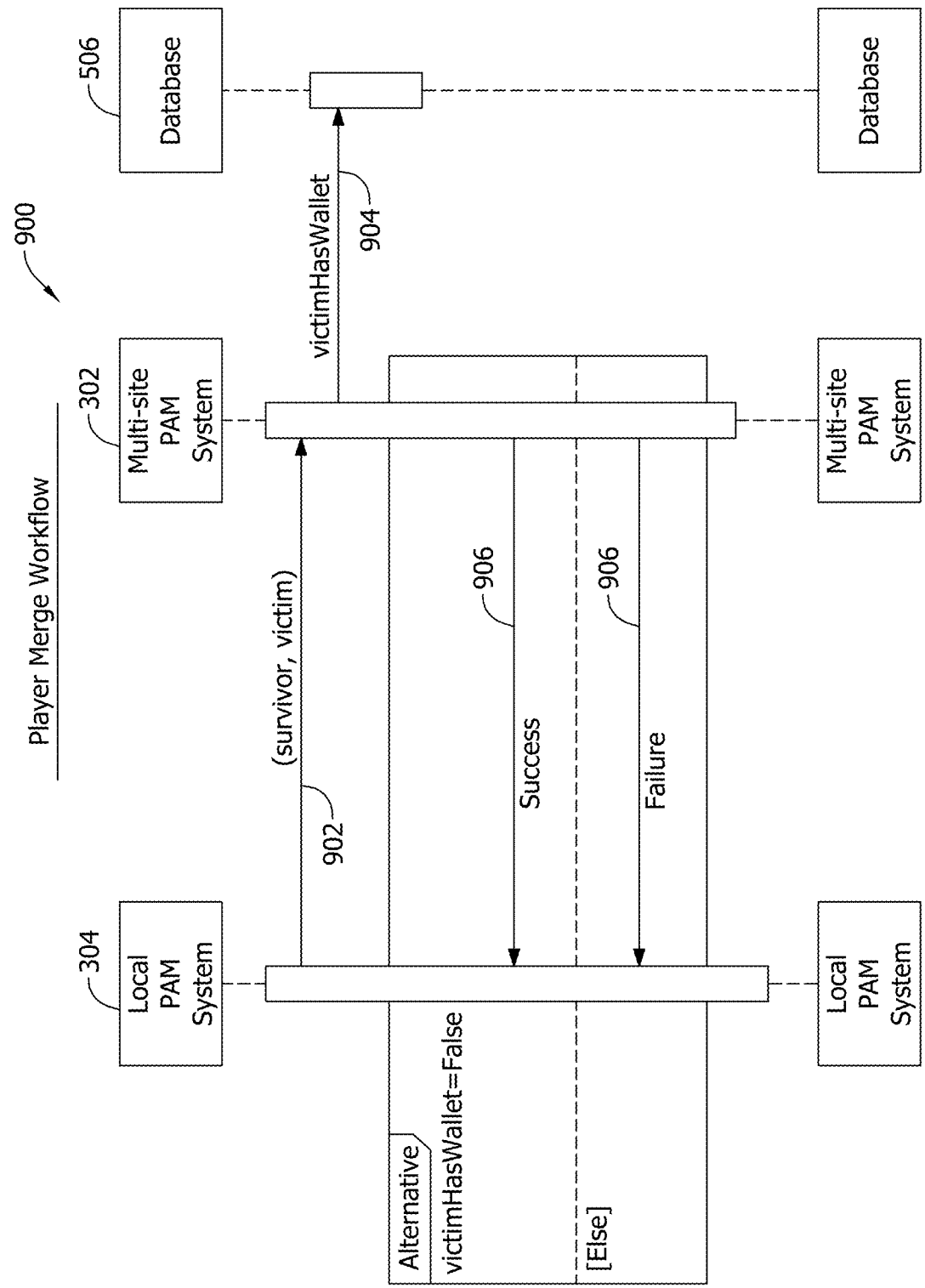
FIG. 9A illustrates an example player account merge process implemented by the system shown in FIG. 3.

FIG. 9A illustrates an example player account merge process 900 implemented by the system 300. As shown in FIG. 9A, process 900 is implemented by local PAM system 304, multi-site PAM system 302, and database 506.

In the example embodiment, process 900 includes local PAM system 304 transmitting a survivor, victim message 902 to multi-site PAM system 302 including data regarding at least one player account (e.g., and/or a player account registration request). Multi-site PAM system 302 then requests 904 and receives player account data from database 506 regarding the at least one player account. Based upon the data received from local PAM system 304 and database 506, multi-site PAM system 302 determines whether or not to merge player accounts and transmits 906 the resulting account(s) to local PAM system 304.

As explained herein, multi-site PAM system 302 stores a flag to indicate whether a player has an active wallet linked to one or more single-site and/or corporation player accounts. If a player account is linked to a wallet account, then the account will not be permitted to be the "victim account" during the merge account process but will be permitted to be the "survivor account."

As used herein, a "victim" account may refer to an account that has all of its historical information merged into another account. A "survivor" account may refer to an account that has all of another account's historical information merged into it. In the example embodiment, the merging described herein may be performed to allow communication to multi-site PAM system 302 that a player has an active wallet account linked to their loyalty and/or player accounts.

In some embodiments, rules may be applied to multi-site & single-site loyalty enterprises and single-site PAM systems. Multi-site PAM system 302 may indicate whether a player has an active wallet linked to their account. If a player account is linked to a wallet account, then that account will not be permitted to be the 'Victim' account during the merge.

In some embodiments, multi-site PAM system 302 may perform a series of validations before the merge happens. Upon validation of that a wallet account is associated to one of the PAM systems as the victim, then multi-site PAM system 302 should stop the merge process and not proceed. If a player account is linked to an active wallet account, then that account will be permitted to be the survivor account during the merge and the merge will complete normally, as described herein.

In the example embodiment, multi-site PAM system 302 determines whether a player has an active wallet linked to their account. Multi-site PAM system 302 then causes a flag to be stored (e.g., in database 506) indicating that the player has a wallet linked to their account. In some embodiments, multi-site PAM system 302 may generate and/or update a player dashboard/interface (e.g., with display of a certain code at a certain tab indicating wallet linking status). For clarification of example merge processes described herein, the following examples are presented.

In a first example Player A account #123 is not linked to a wallet and is merged into a Player A account #456 also not linked to a wallet. Player A account #123 is not linked to a wallet account (Victim) and Player A account #456 (duplicate) is not linked to a wallet account (Survivor). Accordingly, either account can be successfully merged as a Victim or a Survivor. In this scenario the merge is successful. The merge (e.g., performed by multi-site PAM system 302) is successful because neither account #123 or #456 was previously associated with a wallet.

In a second example, Player A account #123 without a wallet is merged into Player A account #456 with a wallet. The merge is successful because the account without a wallet (#123) is merged into the account with a wallet (#456). In other words, Player A account #123 is not linked to a wallet account (Victim). Player A account #456 (duplicate) is linked to a wallet account (Survivor). Thus, only account #123 can be the 'Victim' account and #456 can only be the 'Survivor.' In this scenario the merge is successful.

In a third example, Player A account #123 is linked to a wallet and is attempted to be merged into Player A account #456 not linked to a wallet. This attempted merge fails because the victim account cannot be the account linked to a wallet account when the survivor is not linked to the wallet account. In other words, Player A account #123 is linked to a wallet account (Victim). Player A account #456 (duplicate) is not linked to a wallet account (Survivor). Account #123 cannot be the 'Victim' account. Accordingly, in this scenario, the merge fails.

In a fourth example, Player A account #123 is linked to a wallet and is attempted to be merged into Player A account #456 also linked with a wallet. In this example, the merge fails because both accounts should not be linked to a wallet. In other words, Player A account #123 is linked to a wallet account (Victim) and Player A account #456 (duplicate) is linked to a wallet account (Survivor). Neither account can be the 'Victim' as they both are linked to a wallet. Accordingly, the merge fails.

In the example embodiment, certain rules may be implemented by multi-site PAM system 302 to determine whether to merge player accounts or not. For example, rules utilized to determine to stop player merging may include: i) the victim account should not have wallet account associated therewith (e.g., the survivor account should be the one associated with a wallet account), ii) if SSN of a player is obtained, it should be the same for the victim and survivor accounts, iii) if the survivor account has a wallet associated therewith, the player should have a "WalletMerge" Permission (e.g., only players with this WalletMerge permission will have the ability to perform a wallet merge. No override on the rules for the wallet merge may be allowed).

In some embodiments, failed merges may be captured and stored in a table in memory (e.g., database 506). In some embodiments, "unmerges" may be performed (e.g., to unmerge previously merged accounts). In unmerging, the wallet account associated with the player should stay with the survivor account (e.g., and not be associated with the victim account). In some embodiments, bulk merges may be performed (e.g., the rules may be applied to a plurality of player accounts at once—for example, all player accounts associated with a particular establishment).

Figure 9B:
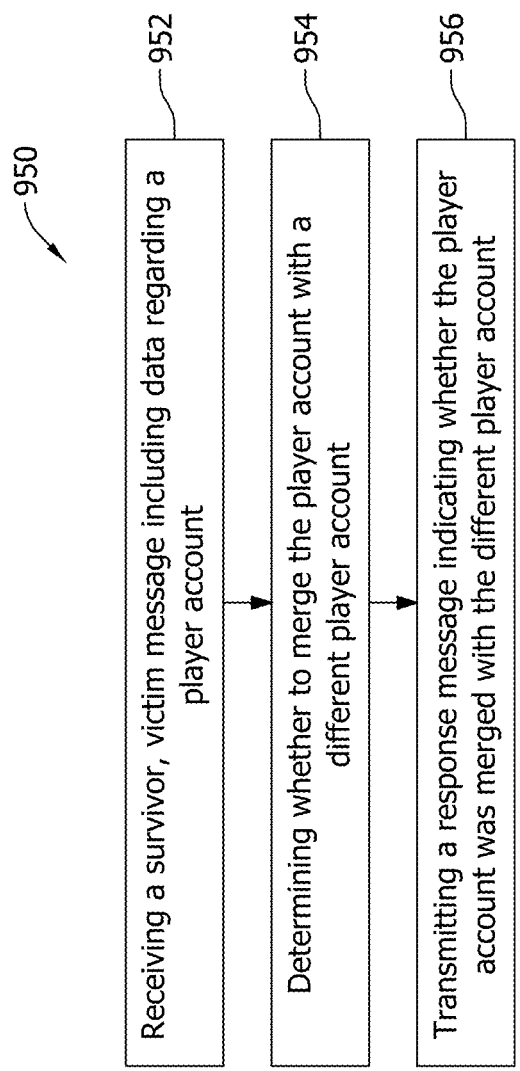
FIG. 9B illustrates an example method associated with the player account merge process shown in FIG. 9A.

FIG. 9B illustrates an example method 950 associated with player account merge process 900. In the example embodiment, method 950 includes receiving 952 a survivor, victim message including data regarding a player account, determining 954 whether to merge the player account with a different player account, and transmitting 956 a response message indicating whether the player account was merged with the different player account.

Figure 10A:
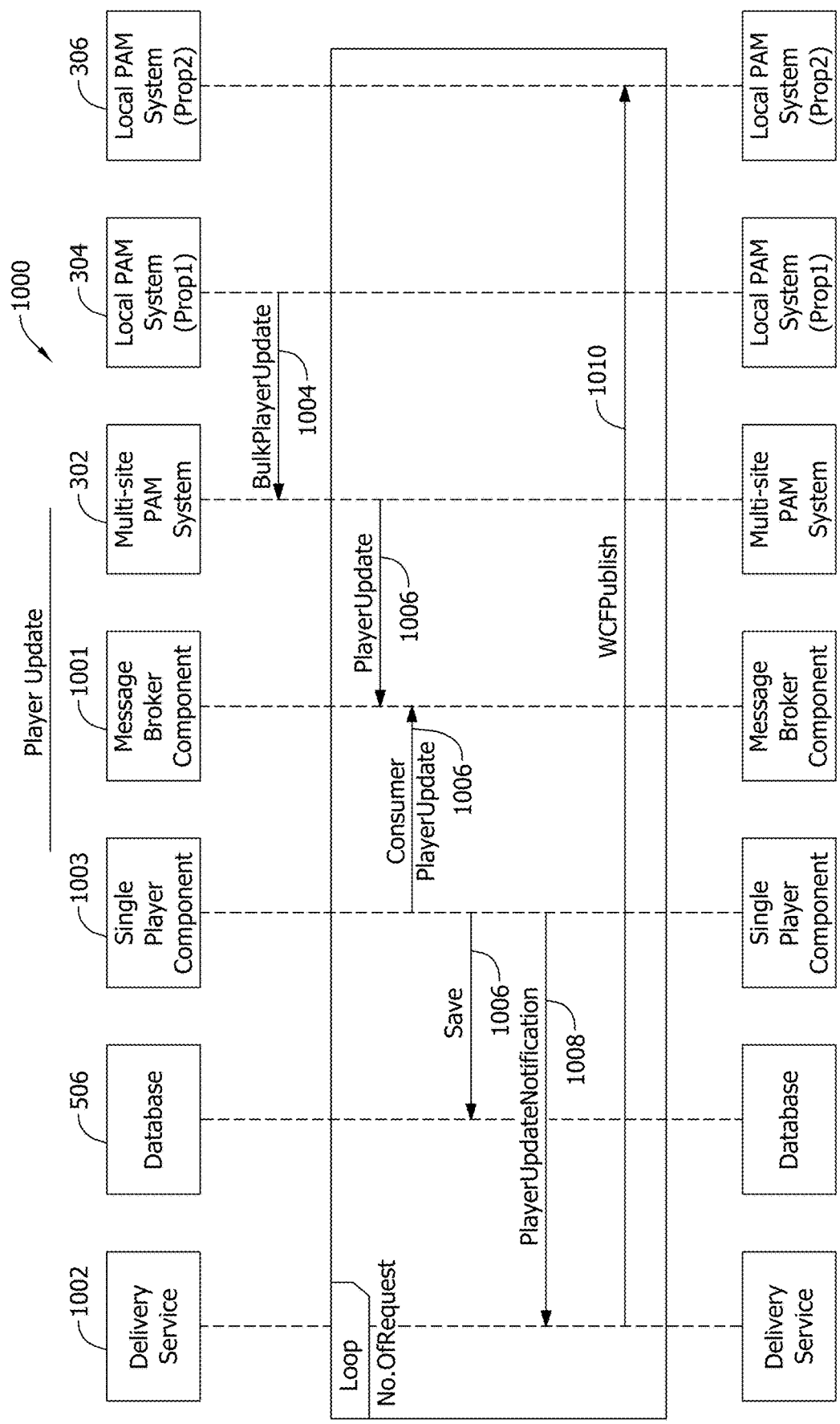
FIG. 10A illustrates an example player account update process implemented by the system shown in FIG. 3.

FIG. 10A illustrates an example player account update process 1000 implemented by system 300. As shown in FIG. 10A, process 1000 is implemented by local PAM systems 304 and 306, multi-site PAM system 302 (e.g., including a message broker component 1001 and a single player component 1003), database 506, and a delivery service 1002.

In the example shown in FIG. 10, process 1000 includes local PAM system 304 initiating a bulk player update 1004 (e.g., a batch of updated information associated with a plurality of player accounts associated with an establishment associated with local PAM system 304) to multi-site PAM system 302. Multi-site PAM system 302 then processes the received updated information and initiates updates 1006 for each player account with updated information received from local PAM system 304 by transmitting/storing at least a portion of the updated data to database 506 (e.g., via message broker component 1001 and single player component 1003). In the example embodiment, multi-site PAM system 302 also initiates an update being sent to other properties by transmitting a player update notification 1008 to a service 1002. Service 1002 then sends updates 1010 to all appropriate properties (e.g., local PAM system 306 associated with one such appropriate property).

Figure 10B:
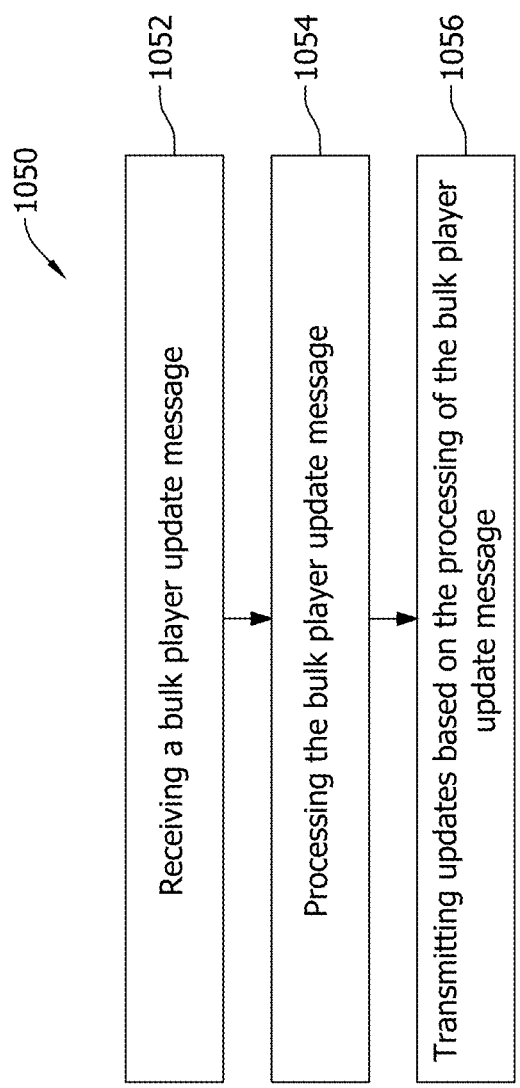
FIG. 10B illustrates an example method associated with the player account update process shown in FIG. 10A.

FIG. 10B illustrates an example method 1050 associated with player account update process 1000. In the example embodiment, method 1050 includes receiving 1052 a bulk player update message, processing 1054 the bulk player update message, and transmitting 1056 updates based on the processing of the bulk player update message.

Figure 11:
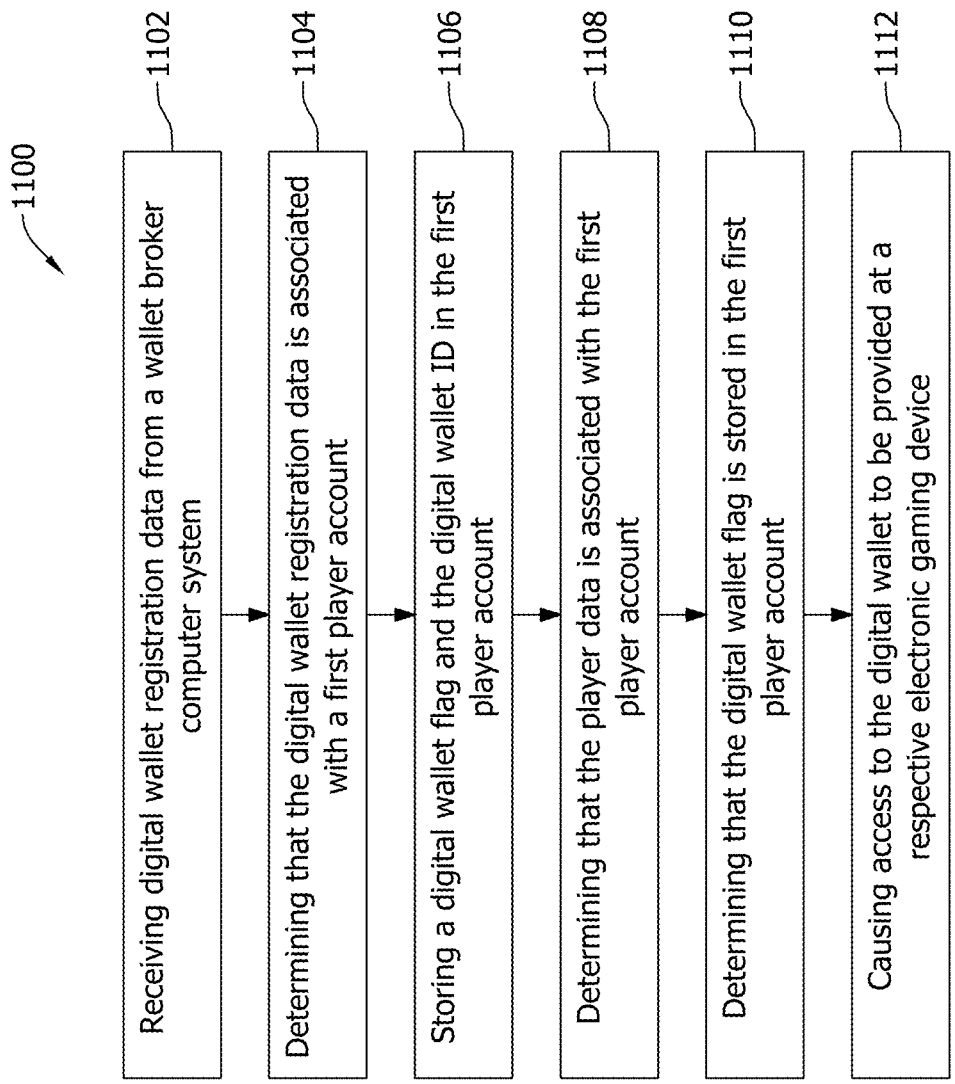
FIG. 11 illustrates an example method for electronic account transfers in casino environments, in accordance with the present disclosure.

FIG. 11 illustrates an example method 1100 for player tracking across electronic gaming sites, in accordance with the present disclosure. In the example embodiment, method 1100 includes receiving 1102 digital wallet registration data from a wallet broker computer system (e.g., broker 316) wherein the digital wallet registration data is associated with a digital wallet and includes a digital wallet ID, determining 1104 that the digital wallet registration data is associated with a first player account, and storing 1106 a digital wallet flag and the digital wallet ID in the first player account wherein the digital wallet flag indicates that the first player account is associated with the digital wallet. The method also includes, upon receipt of player data based on a card-in event associated with the first player account at a respective electronic gaming device of a respective electronic gaming property including at least one of a first electronic gaming device at a first electronic gaming property or a second electronic gaming device at a second electronic gaming property, determining 1108 that the player data is associated with the first player account based on the player data, determining 1110 that the digital wallet flag is stored in the first player account, and causing 1112 access to the digital wallet to be provided at the respective electronic gaming device.

In some embodiments, method 1100 includes receiving digital wallet registration data from the wallet broker computer system, wherein the digital wallet registration data is generated by the wallet broker computer system in response to a request from an end user device associated with the first player account. In some embodiments, method 1100 includes transmitting the digital wallet ID to a local player account management (PAM) system associated with the respective electronic gaming property, wherein in response to receiving the digital wallet ID, the PAM system communicates with the wallet broker computer system, thereby causing access to the digital wallet to be provided at the respective electronic gaming device.

For example, in some embodiments of method 1100 data transmitted from the wallet broker computer system to the local PAM system is transmitted by the local PAM system to the respective electronic gaming device, and wherein the wallet data includes wallet balance data associated with a balance of the digital wallet. Further, in some embodiments, method 1100 includes receiving player account activity data associated with the first player account from the local PAM system, determining that player account activity data satisfies an inactivity threshold including a number of days of inactivity, and inactivating the first player account based on the player account activity data satisfying the inactivity threshold.

In some embodiments, method 1100 includes identifying a second player account associated with the first player account, determining that first player account includes the digital wallet flag and the second player account does not include the digital wallet flag, and causing the second player account to merge into the first player account.

Figure 12:
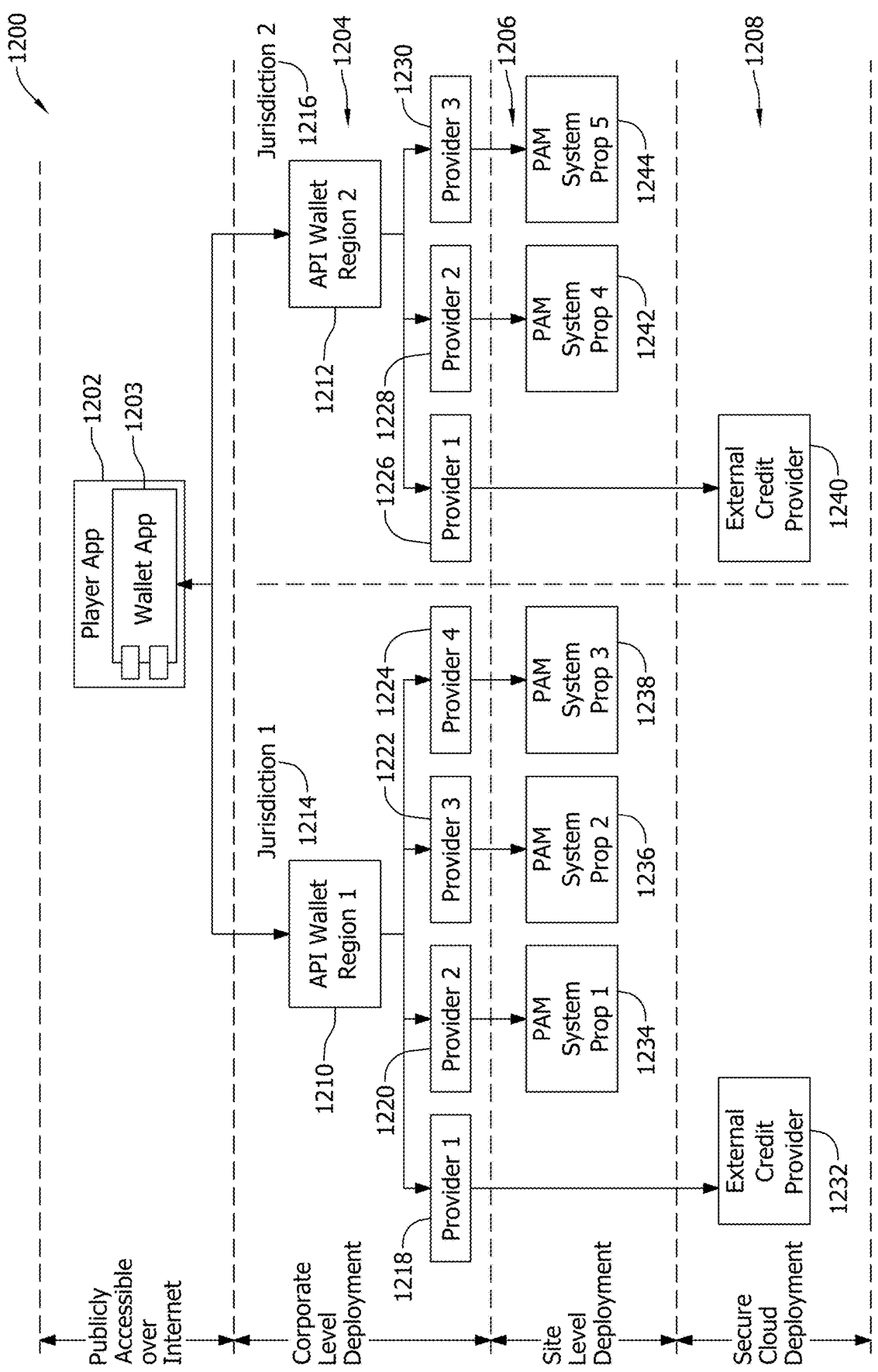
FIG. 12 illustrates another example multi-site electronic gaming system, furthering the example shown in FIG. 3.

As another illustration of the example embodiment, FIG. 12 illustrates an example multi-site electronic gaming system 1200, furthering the example shown in FIG. 3. As shown in FIG. 12, system 1200 includes a player app 1202 (e.g., publicly accessible over the Internet and including loyalty and wallet information, such as app 402) including an embedded wallet app 1203, a jurisdiction layer 1204 (e.g., facilitating transfer of funds from one localized wallet account to another), site level layer 1206 (e.g., where money moves from a localized wallet account to an EGM), and cloud layer 1208 (e.g., where money is transferred to a third party outside of a casino operator).

In the example of FIG. 12, layer 1204 includes a wallet API 1210, 1212 (e.g., associated with one or more wallet brokers, such as broker 316) for each shown jurisdiction 1214, 1216 (e.g., geographical regions). For example, jurisdictions 1214, 1216 are each associated with their own wallet API 1210, 1212 so that fund transfers across jurisdictions 1214, 1216 are avoided (e.g., for regulatory purposes). As an example, gaming regulations in some jurisdictions may require that funds only be transferred within a respective jurisdiction (e.g., to accurately track movement of money and to potentially avoid commingling of funds). Accordingly, system 1200 provides for transferring balances across localized wallet accounts while accurately tracking movement of money using flags as described herein and avoids transferring of funds over different jurisdictions.

Wallet API 1210 is in communication with digital wallet providers 1218-24 and API 1212 is in communication with digital wallet providers 1226-1230. Provider 1218 (e.g., an external wallet provider used to transfer funds between providers 1220-1224) is in communication with a credit provider 1232 while providers 1220-1224 (e.g., different casino wallet providers for a single casino operator) are in communication with a respective one of PAM systems 1234-1238 (e.g., including one or more local PAM systems and/or multi-site PAM systems). For example, each respective provider 1220-1224 and PAM system 1234-1238 pair may be associated with a property in jurisdiction 1214.

For instance, currently, each casino property has its own digital wallet that a patron must log into to start the transfer of money. For example, in current systems, when a patron goes to a first property, the patron would have to open the digital wallet (e.g., associated with provider 1220) for the first property. When the patron moves to a second property, the patron would have to open and access the digital wallet (e.g., associated with provider 1222) for the second property. For example, digital wallets may be associated with a single property for regulatory purposes. Thus, existing consumer-based wallets do not have the functionality to manage and track funds transferred from one casino to another casino. Accordingly, system 1200 provides the architecture for managing and transferring funds from one casino to another (e.g., across localized wallet accounts (e.g., associated with the same universal wallet ID and player wallet account) and providers 1218-1224).

Similarly, provider 1226 is in communication with a credit provider 1240 while providers 1228, 1230 are in communication with a respective PAM system 1242, 1244. In the example shown in FIG. 12, each respective provider 1228, 1230 and system 1242, 1244 pair may be associated with a property in jurisdiction 1216.

As shown in FIG. 12, layer 1204 is deployed at a casino corporate level. Because of jurisdiction restrictions, layer 1204 separates and isolates different funding accounts according to jurisdictions to prevent money from transferring across different jurisdictions 1214, 1216. For example, each jurisdiction 1214, 1216 is associated with its own wallet API 1210, 1212 to prevent commingling of funds from separate jurisdictions. Within each region, layer 1204 moves funds between different localized wallet accounts and/or external fund provider(s). Specifically, layer 1204 (e.g., including wallet APIs) aggregates localized wallet accounts across different casino properties (e.g., associated with each respective pair of providers 1220-1224, 1228, 1230 and systems 1234-1238, 1242, 1244) and external funding provider(s) (e.g., 1232, 1240) as funding providers to allow a player to automatically have access to his or her funds according to a location of the player.

Different functionalities are provided by system 1200 (e.g., to seamlessly make funds available across multiple casino wagering accounts). For example, a provider type parameter (e.g., provider ID) may be defined to identify whether a funding provider type is a casino wagering account or external funding providers/accounts. Further, a provider name parameter based on the casino name and/or property information may be defined. Layer 1204 also is in communication with a database (not shown), such as a table, to determine player locations, including a defined previous provider and a defined current provider (e.g., and/or whether a dirty flag, as described herein, is associated with a player account). While a dirty flag is described with respect to the example embodiments, a different type of parameter could be used in some examples. For instance, while a dirty flag may be one bit, a parameter including multiple bits may be utilized (e.g., a parameter field).

A provider parameter (e.g., located in the header of a message) allows layer 1204 to check whether a player wallet account exists for a particular player. If a player wallet account has not been setup by/for the player, layer 1204 could trigger the wallet enrollment process (e.g., by transmitting a message to a device at a property where the player is located to prompt the player to create a player wallet account).

With layer 1204 being implemented at the corporate level, movement of funds between properties in a jurisdiction can occur without involving an external credit provider. For example, layer 1204 may aggregate properties and an external credit provider as a funding provider and allow transfers between the properties and/or provider.

Figure 13:
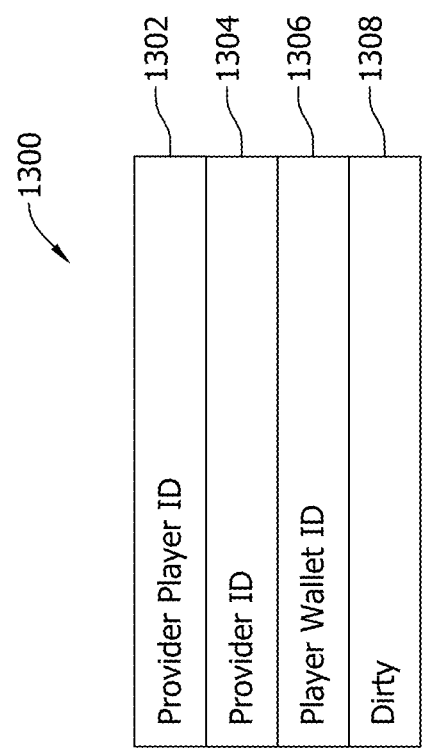
FIG. 13 illustrates example data table 1300 illustrating data included in different messages described herein implemented by the system shown in FIG. 12.

FIG. 13 illustrates example data table 1300 illustrating data included in different messages described herein (e.g., showing different data types utilized by system 1200). In the example embodiment, table 1300 illustrates that in certain messages include a provider player ID 1302 (e.g., a player account ID), a provider ID 1304 (e.g., an ID associated with an external provider and/or a casino), a player wallet ID 1306 (e.g., a universal wallet ID), and a dirty flag field 1308 (e.g., indicating whether or not player wallet ID 1306 is associated with a balance remaining at a localized wallet account associated with the player wallet account associated with player wallet ID 1306). For example, data shown in table 1300 may be looked up by multi-site PAM system 302 and/or a wallet API in order to identify whether a dirty flag associated with a player wallet account exists at a localized wallet account, and to identify other information regarding the balance (e.g., which provider and/or casino is associated with the localized wallet account where the balance remains).

Figure 14A:
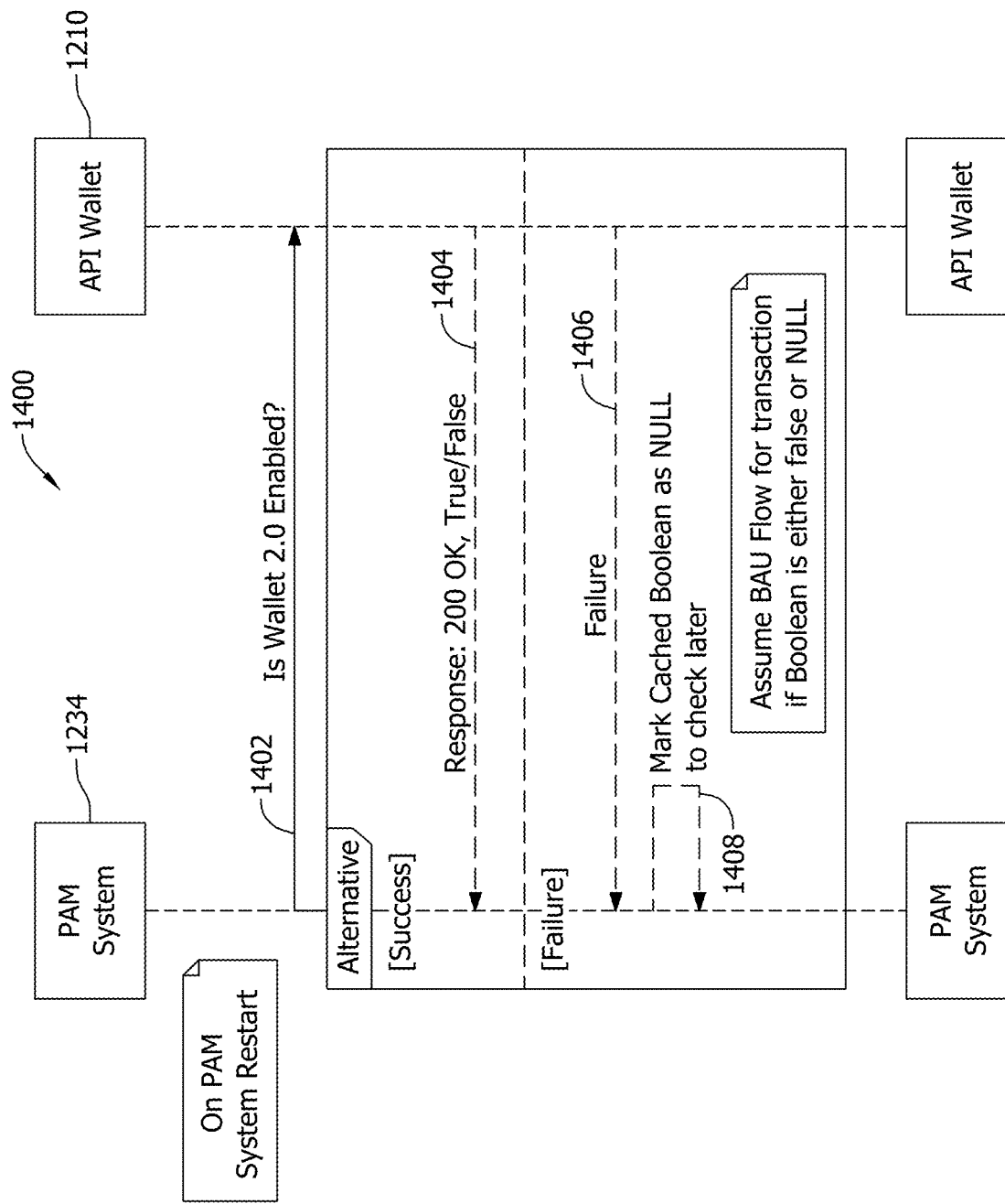
FIG. 14A illustrates an example wallet check process implemented by the system shown in FIG. 12.

FIG. 14A illustrates an example wallet check process 1400 implemented by system 1200. In the example of FIG. 14A, process 1400 is implemented by PAM system 1234 (e.g., including one or more local PAM systems and/or multi-site PAM systems) and wallet API 1210 (e.g., associated with a wallet broker). As shown, PAM system 1234 may transmit a wallet check message 1402 to wallet API 1210 (e.g., with player information for one or more players to see if the one or more players has a digital wallet enabled with respect to a respective player account at a property associated with PAM system 1234).

Upon receipt of message 1402, wallet API 1210 performs a lookup (e.g., in some embodiments, causes multi-site PAM system 302 perform a lookup for a wallet flag) to see if the one or more players have a digital wallet enabled with respect to a respective player account at the property associated with PAM system 1234. If yes, wallet API 1210 transmits a success message 1404 to PAM system 1234 indicating a digital wallet is linked to a respective player account. If no, wallet API 1210 transmits a failure message 1406 to PAM system 1234 indicating no digital wallet is linked to a respective player account. Upon receipt of message 1406, PAM system 1234 may store an indication 1408 that no digital wallet is linked to a respective player account so that PAM system 1234 knows to check for a linked digital wallet in the future (e.g., by re-transmitting message 1402).

Figure 14B:
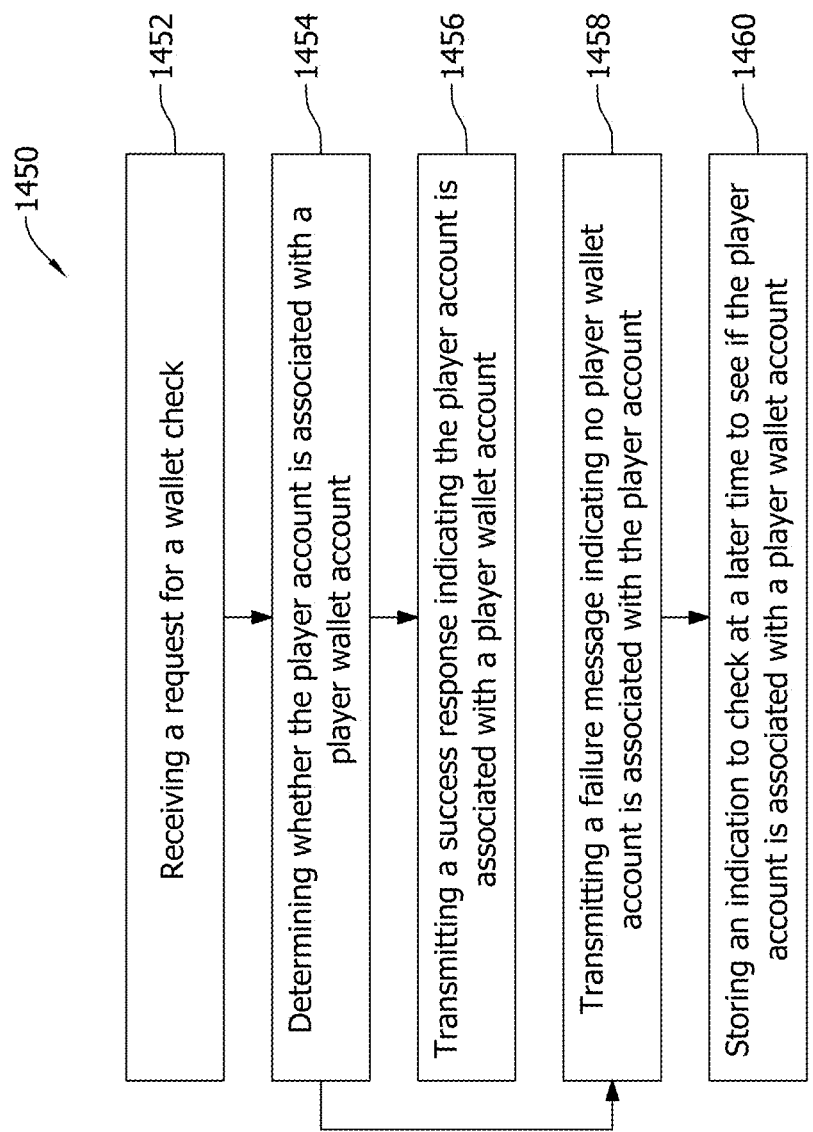
FIG. 14B illustrates an example method associated with the wallet check process shown in FIG. 14A.

FIG. 14B illustrates an example method 1450 associated with wallet check process 1400. In the example embodiment, method 1450 includes receiving 1452 a request for a wallet check to see if a player wallet account is associated with a player account an determining 1454 whether the player account is associated with a player wallet account. In embodiments where the player account is associated with a player wallet account, method 1450 includes transmitting 1456 a success response indicating the player account is associated with a player wallet account. In embodiments where the player account is not associated with a player wallet account, method 1450 includes transmitting 1458 a failure message indicating no player wallet account is associated with the player account and storing 1460 an indication to check at a later time to see if the player account is associated with a player wallet account.

Figure 15A:
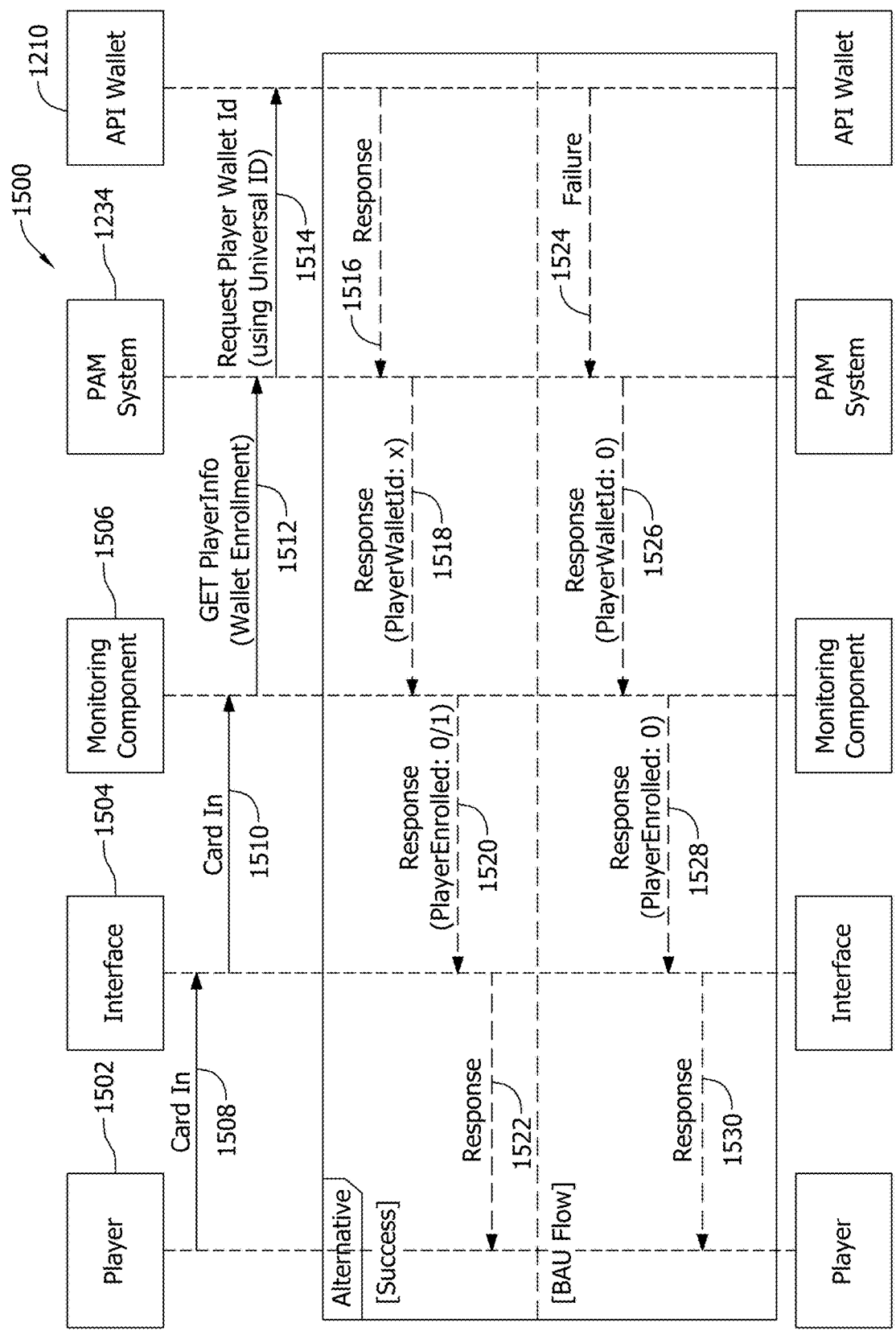
FIG. 15A illustrates an example card-in process implemented by the system shown in FIG. 12.

FIG. 15A illustrates an example card-in process 1500 implemented by system 1200. As shown in FIG. 15A, process 1500 is implemented by a player 1502, an interface 1504 of a gaming device, a monitoring component 1506 associated with a property (e.g., to assist with automatic monitoring and control of a gaming floor at the property), PAM system 1234, and wallet API 1210.

In the example embodiment, process 1500 includes player 1502 initiating a card-in event 1508 and card-in event 1508 being detected by interface 1504. Accordingly, interface 1504 transmits a card-in message 1510 to monitoring component 1506 to indicate the card-in by player 1502 (e.g., including player account information associated with player 1502).

Upon receipt of message 1510, component 1506 generates and transmits a player information request 1512 (e.g., for digital wallet enrollment information associated with player 1502) to PAM system 1234. PAM system 1234 then generates and transmits a wallet request 1514 (e.g., including a player ID associated with player 1502) to wallet API 1210.

If wallet API 1210 identifies a digital wallet associated with the property associated with PAM system 1234 and player 1502 (e.g., based on multi-site PAM system 302 identifying a wallet flag stored in memory), wallet API 1210 generates and transmits a response message 1516 including digital wallet information (e.g., a wallet ID) associated with the property associated with PAM system 1234 and player 1502 to PAM system 1234. PAM system 1234 then generates and transmits a response message 1518 including the digital wallet information to monitoring component 1506. Monitoring component 1506 then generates and transmits a player enrollment confirmation message 1520 to interface 1504, which causes communication 1522 of the confirmation to player 1502.

If wallet API 1210 does not identify a digital wallet associated with the property associated with PAM system 1234 and player 1502 (e.g., based on no wallet flag being stored in memory), wallet API 1210 generates and transmits a failure message 1524 to PAM system 1234. PAM system 1234 then generates and transmits a no wallet message 1526 to monitoring component 1506. Monitoring component 1506 then generates and transmits a no enrollment message 1528 to interface 1504, which causes communication 1530 of the failure to player 1502. In some embodiments, if no digital wallet is identified, a prompt may be caused to be displayed by interface 1504 allowing the player to link a digital wallet to their player account.

Figure 15B:
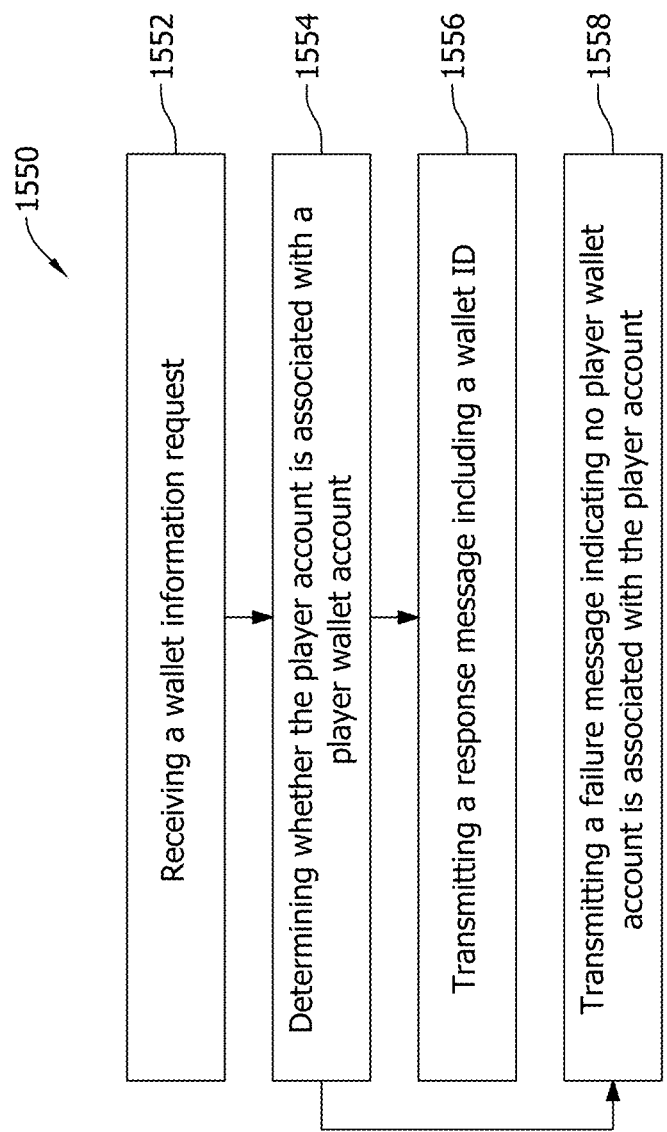
FIG. 15B illustrates an example method associated with the card-in process shown in FIG. 15A.

FIG. 15B illustrates an example method 1550 associated with card-in process 1500. In the example embodiment, method 1550 includes receiving 1552 a wallet information request (e.g., including player account data) based on a card-in event associated with a player account and determining 1554 whether the player account is associated with a player wallet account. In embodiments where the player account is associated with a player wallet account, method 1550 includes transmitting 1556 a response message including a wallet ID (e.g., universal wallet ID) associated with the player wallet account. In embodiments where the player account is not associated with a player wallet account, method 1550 includes transmitting 1558 a failure message indicating no player wallet account is associated with the player account.

Figure 16A:
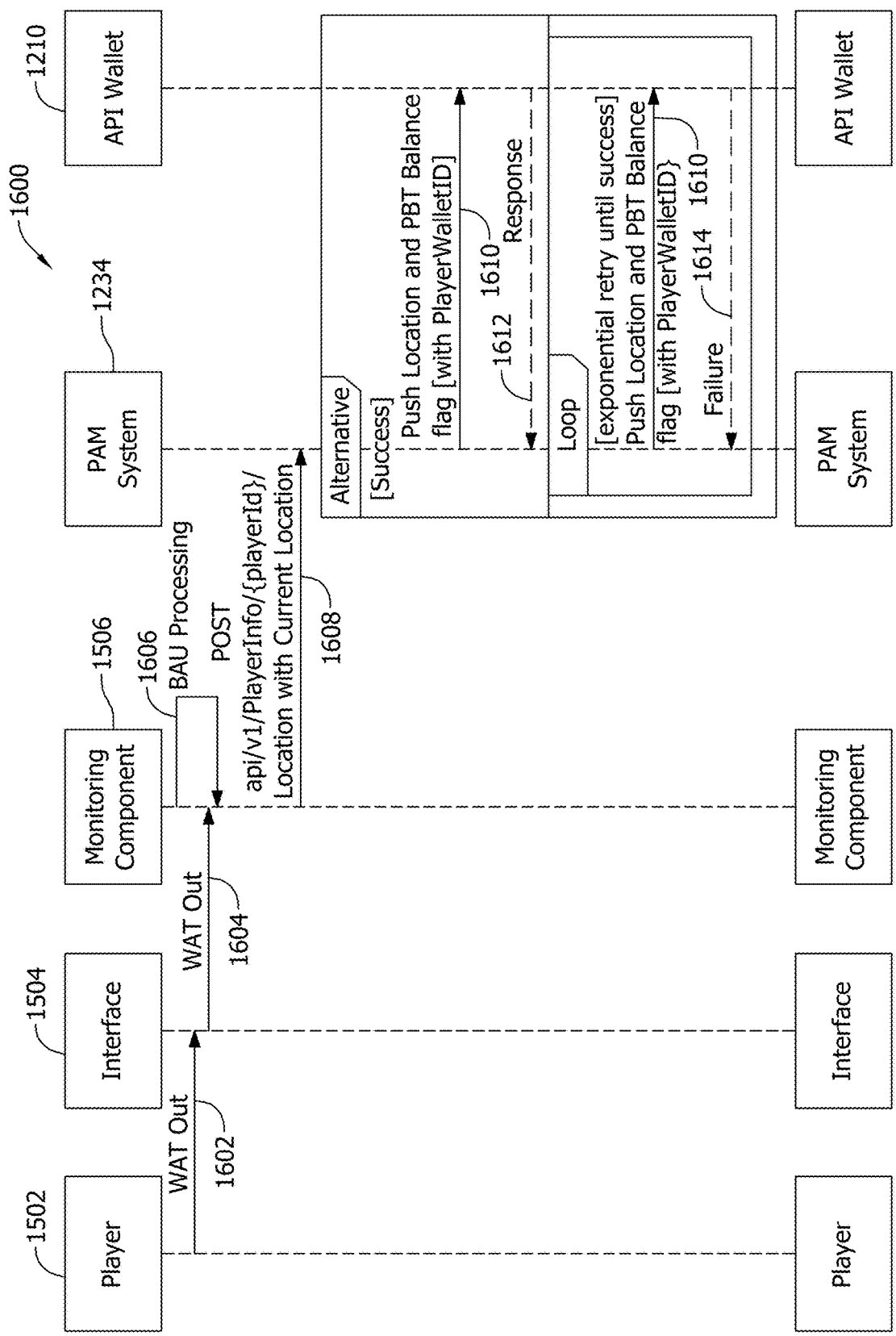
FIG. 16A illustrates an example card-out process implemented by the system shown in FIG. 12.

FIG. 16A illustrates an example card-out process 1600 implemented by system 1200. As shown in FIG. 16A, process 1600 is implemented by player 1502, interface 1504 of a gaming device, monitoring component 1506 associated with a property (e.g., to assist with automatic monitoring and control of a gaming floor at the property), PAM system 1234, and wallet API 1210.

In the example embodiment, process 1600 includes player 1502 initiating a card-out event 1602 (e.g., a wallet account transfer (WAT) input) and card-out event 1602 being detected by interface 1504. Accordingly, interface 1504 transmits a card-out message 1604 to monitoring component 1506 to indicate the card-out by player 1502 (e.g., including player account information associated with player 1502). Component 1506 then processes 1606 the card-out and transmits updated player information 1608 to PAM system 1234 (e.g., including a "current" location of the player being the site associated with the gaming device including interface 1504 and a flag indicating whether or not a balance remains in a localized wallet account of player 1502 at the establishment associated with the gaming device including interface 1504).

PAM system 1234 then generates and transmits a message 1610 to wallet API 1210 including an updated (e.g., current) location of player 1502, a wallet ID associated with a digital wallet of player 1502, and, if a balance remains in a player account of player 1502 at the establishment associated with the gaming device including interface 1504, an indication triggering generation of a balance flag indicating the remaining balance exists in the localized wallet account.

Upon receipt of message 1610 by wallet API 1210, wallet API 1210 updates information stored in a wallet database to be updated to indicate the updated location and/or the wallet flag, and wallet API 1210 transmits a confirmation response 1612 to PAM system 1234 upon successful storage. If wallet API 1210 is unable to cause the wallet database to update, wallet API 1210 transmits a failure message 1614 to PAM system 1234, and PAM system 1234 may resend message 1610 to wallet API 1210 in a loop as un exponential retry until confirmation response 1612 is received.

Figure 16B:
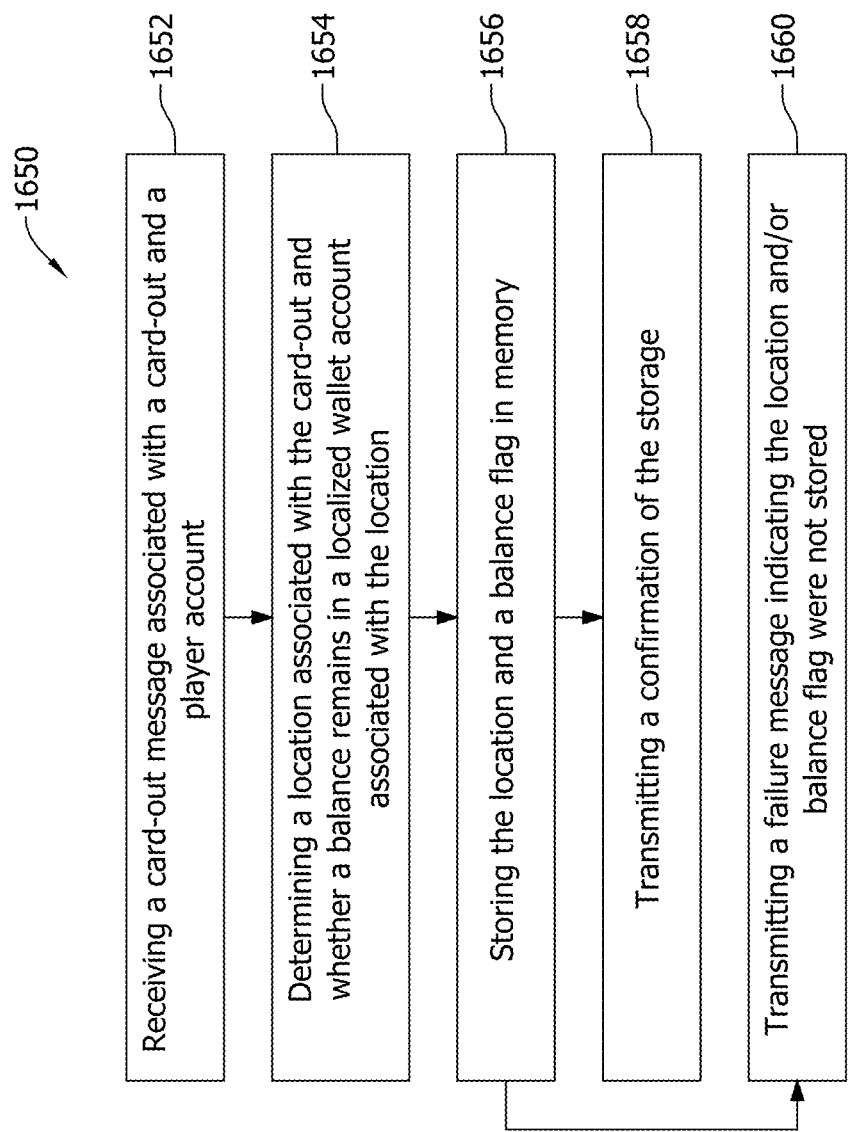
FIG. 16B illustrates an example method associated with the card-out process shown in FIG. 16A.

FIG. 16B illustrates an example method 1650 associated with card-out process 1600. In the example embodiment, method 1650 includes receiving 1652 a card-out message associated with a card-out and a player account and determining 1654 a location associated with the card-out and whether a balance remains in a localized wallet account associated with the location. In embodiments where a balance remains, method 1650 includes storing 1656 the location and a wallet flag in memory and transmitting 1658 a confirmation of the storage. In embodiments where storage is unsuccessful, method 1650 includes transmitting 1660 a failure message indicating the location and/or wallet flag were not stored.

Figure 17A:
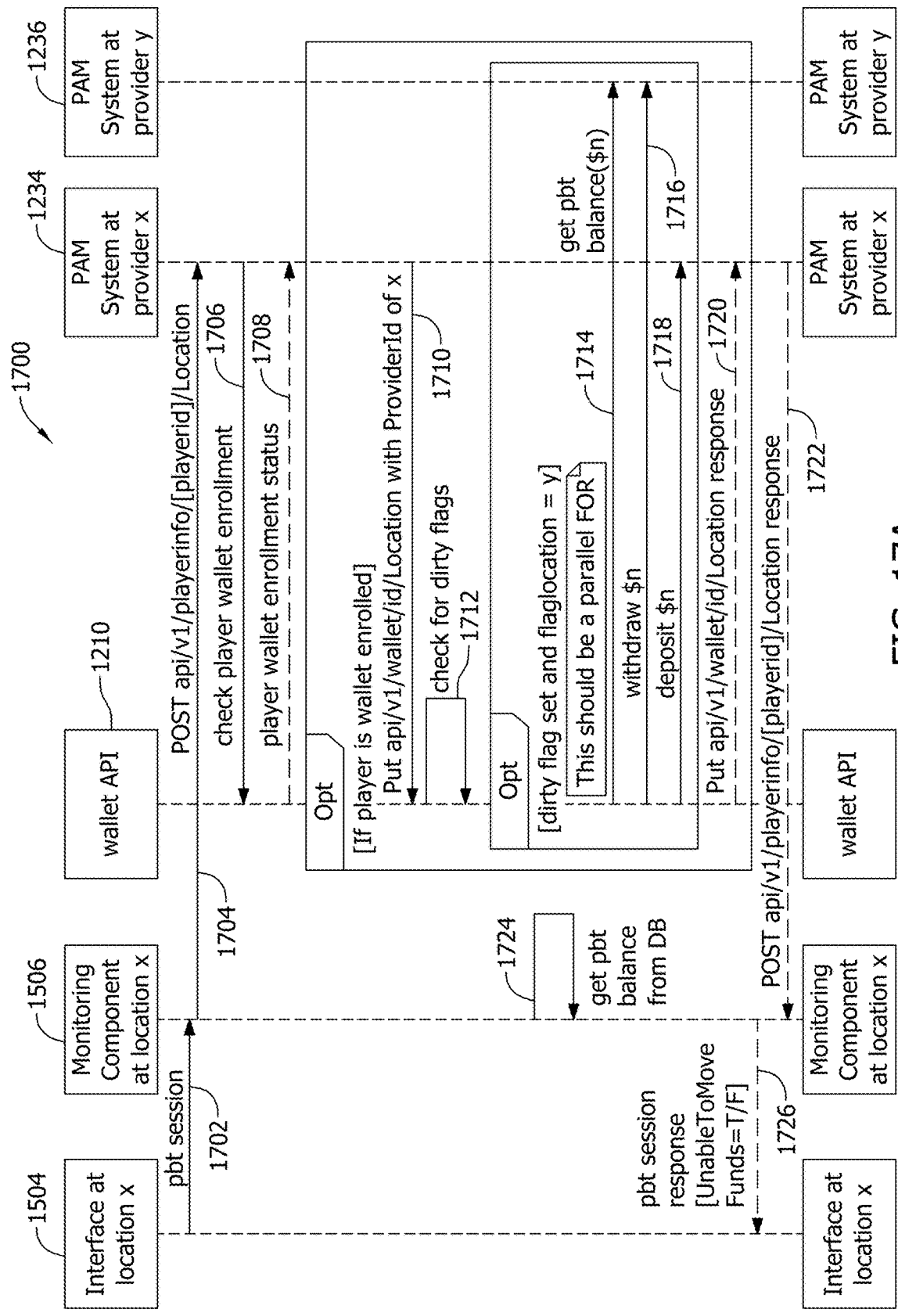
FIG. 17A illustrates an example balance movement process across multiple properties implemented by the system shown in FIG. 12.

FIG. 17A illustrates an example balance movement process 1700 implemented by system 1200. As shown in FIG. 17A, process 1700 is implemented by interface 1504 of a gaming device at a first location, monitoring component 1506 associated with the first location, wallet API 1210 (e.g., of multi-site PAM system 302), PAM system 1234 (e.g., here, representing a local PAM system) associated with the first location, and PAM system 1236 (e.g., here, representing another local PAM system) associated with a second location.

In the example embodiment, interface 1504 transmits a gaming session message 1702 to monitoring component 1506. Component 1506 then transmits a player message 1704 regarding a gaming session (e.g., including player information, a player ID, and player location data) to PAM system 1234 for processing. Then, PAM system 1234 transmits a wallet enrollment check message 1706 (e.g., including the player ID) to wallet API 1210. Wallet API 1210 performs a lookup to determine whether the player associated with the gaming session has a player wallet account linked to the player account associated with the first location and transmits a player wallet enrollment status message 1708 to PAM system 1234 (e.g., indicating whether or not the player has a player wallet account linked to the player account).

If the player does have a wallet account, PAM system 1234 transmits a player information message 1710 to wallet API 1210 (e.g., message 1710 including the player wallet ID and player location—such as the first location). In response to receiving message 1710, wallet API 1210 performs a lookup 1712 for any "dirty flags" as described herein (e.g., saved flags indicating a balance in a localized wallet account (e.g., the current location or a different location (e.g., a previous location) in the same jurisdiction and/or under the same corporation).

FIG. 17A illustrates an example where a player does have a balance at a second location. Accordingly, wallet API 1210 identifies a dirty flag associated with the second location, and transmits a message 1714 via wallet API 1210 to PAM system 1236 requesting a player balance at the second location (e.g., in a player account associated with the second location). Wallet API 1210 then withdraws 1716 the player balance from the second location and deposits 1718 the player balance at the first location (e.g., in a localized wallet account associated with the first location). Wallet API 1210 may also generate and transmit a response message 1720 to PAM system 1234 including, for example, an updated location where the player balance is accessible.

Upon the deposit at PAM system 1234, PAM system 1234 transmits a message 1722 to component 1506 notifying component 1506 of the deposit. Component 1506 then retrieves 1724 the player balance from a database (e.g., a wallet system) based on being notified of the deposit via message 1722. Component 1506 further transmits a response message 1726 to interface 1504 confirming the deposit. In some embodiments, messages 1722, 1726 may instead be notifications/responses of no deposit being made or a requested deposit failing to be performed.

It should be appreciated that the process of checking for player balances may also be performed within the same location. For example, a player may terminate a gaming session at a first gaming device within a property and then card-in to a second gaming device at the property. Accordingly, a wallet API and/or local PAM system would save a dirty flag when the gaming session at the first gaming device is terminated and cause the player balance to transfer to the second gaming device when the player cards in to the second gaming device (e.g., based upon identifying the dirty flag and the balance associated with the dirty flag).

Figure 17B:
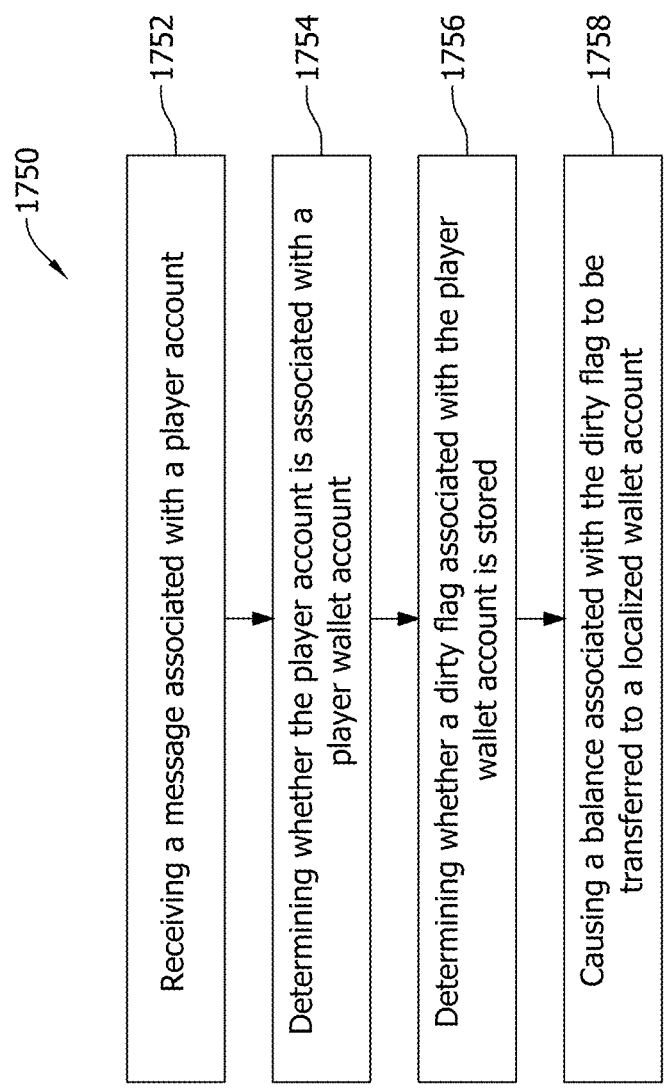
FIG. 17B illustrates an example method associated with the balance movement process across multiple properties shown in FIG. 17A.

FIG. 17B illustrates an example method 1750 associated with balance movement process 1700. In the example embodiment, method 1750 includes receiving 1752 a message associated with a player account based on a card-in event at a gaming device at a location and determining 1754 whether the player account is associated with a player wallet account. In response to determining whether the player account is associated with a player wallet account, method 1750 also includes determining 1756 whether a dirty flag associated with the player wallet account is stored and, in response to determining a dirty flag is stored with respect to, causing 1758 a balance associated with the dirty flag to be transferred to a localized wallet account associated with the player wallet account and the location.

Figure 18A:
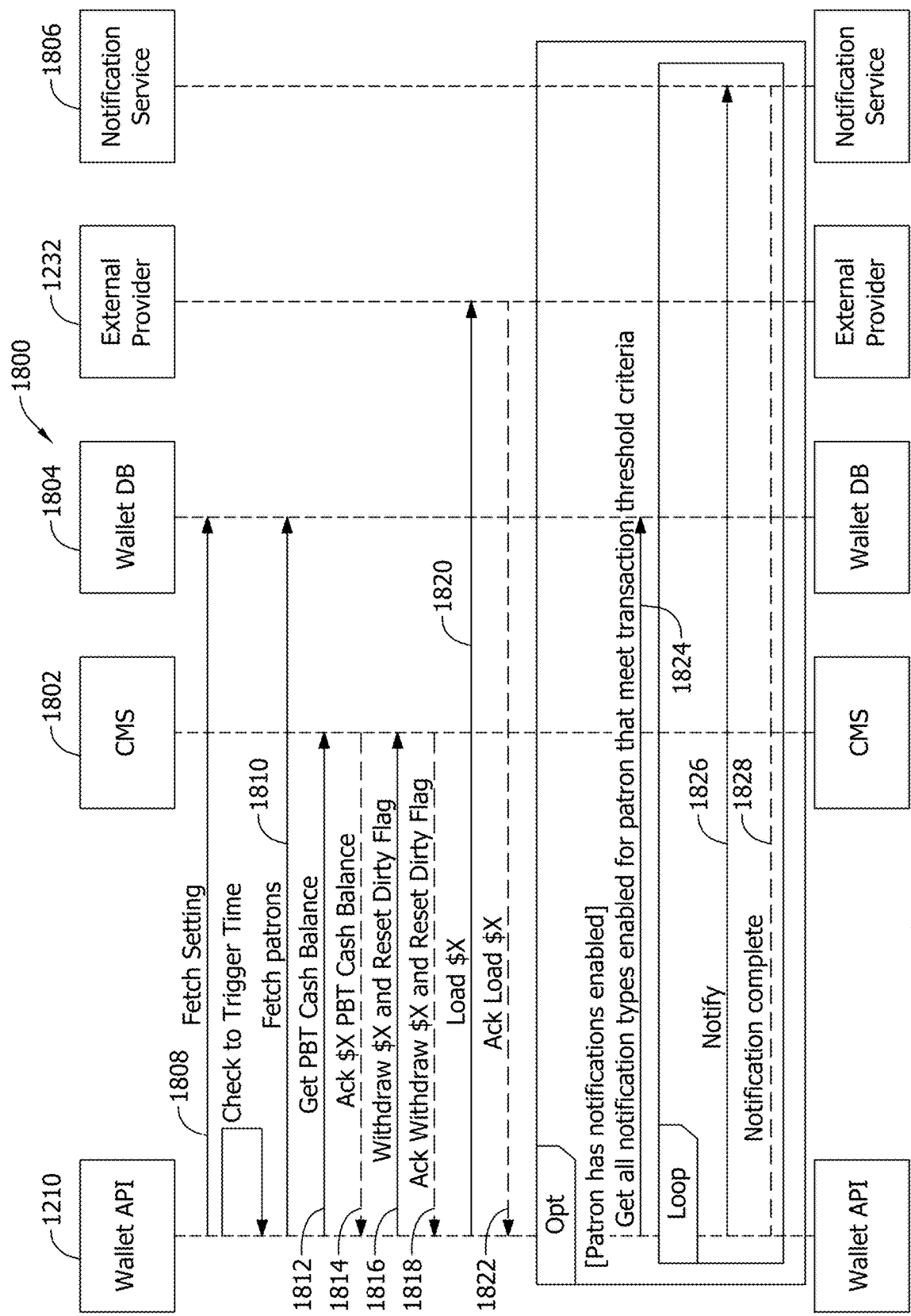
FIG. 18A illustrates an example automated funds transfer process implemented by the system shown in FIG. 12.

FIG. 18A illustrates an example automated funds transfer process 1800 implemented by system 1200. As shown in FIG. 18A, process 1800 is implemented by wallet API 1210, a casino management system 1802 (e.g., 114 and/or including a local PAM system), a wallet database 1804, external funding provider 1232, and a notification service 1806.

In the example embodiment, process 1800 includes wallet API 1210 requesting and receiving settings 1808 and player information 1810 from wallet database 1804. Upon wallet API 1210 determining to automatically transfer funds (e.g., based on a predetermined amount of time passing since a player associated with the funds was active at a casino associated with the funds), wallet API 1210 requests 1812 and receives 1814 player balance information from casino management system 1802. Then, upon wallet API 1210 identifying a dirty flag in the player balance information (e.g., indicating a balance remains at a site associated with casino management system 1802), wallet API 1210 transmits a message 1816 to casino management system 1802 to withdraw the player balance and reset the dirty flag (e.g., at a localized wallet account). In response, casino management system 1802 transmits acknowledgements 1818 to wallet API 1210 of the withdrawn player balance and resetting of the dirty flag.

In some embodiments, wallet API 1210 then loads 1820 the player balance to external funding provider 1232 and external funding provider 1232 acknowledges 1822 the loading of the player balance.

In some embodiments, players may have certain notifications enabled (e.g., as identified in settings 1808). In some embodiments, multi-site PAM system 302 and/or wallet API 1210 may cause all notifications to be enabled for certain player accounts that meet transaction threshold criteria by transmitting a message 1824 to wallet database 1804.

In embodiments where a player has notifications enabled, upon withdraw and/or deposit of a balance, wallet API 1210 may transmit a notification 1826 to notification service 1806. Notification service 1806 then facilitates transmission of the appropriate player notifications (e.g., to a player device—notifying the player of a withdraw, deposit, etc.). Notification service 1806 confirms 1828 to wallet API 1210 that the appropriate notifications were sent.

Figure 18B:
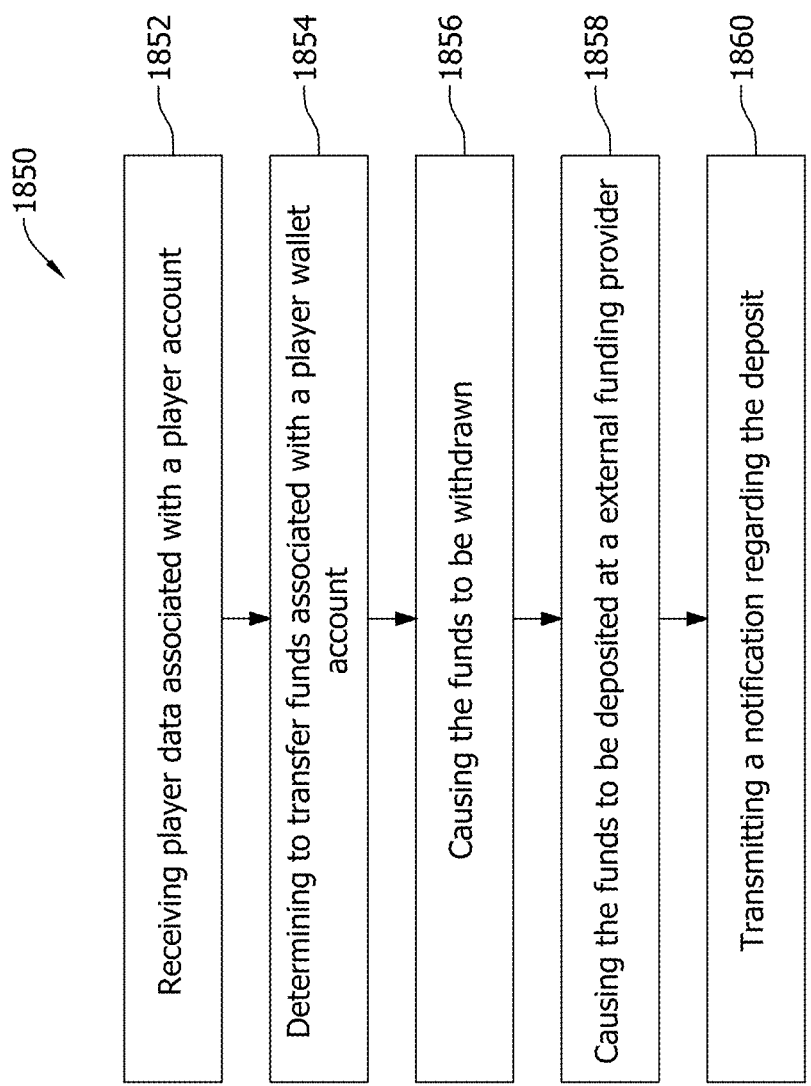
FIG. 18B illustrates an example method associated with the automated funds transfer process shown in FIG. 18A.

FIG. 18B illustrates an example method 1850 associated with automated funds transfer process 1800. In the example embodiment, method 1850 includes receiving 1852 player data associated with a player account, determining 1854 to transfer funds associated with a player wallet account (e.g., and a localized wallet account thereof) associated with the player account, causing 1856 the funds to be withdrawn, causing 1858 the funds to be deposited at a external funding provider, and transmitting 1860 a notification regarding the deposit.

Figure 19A:
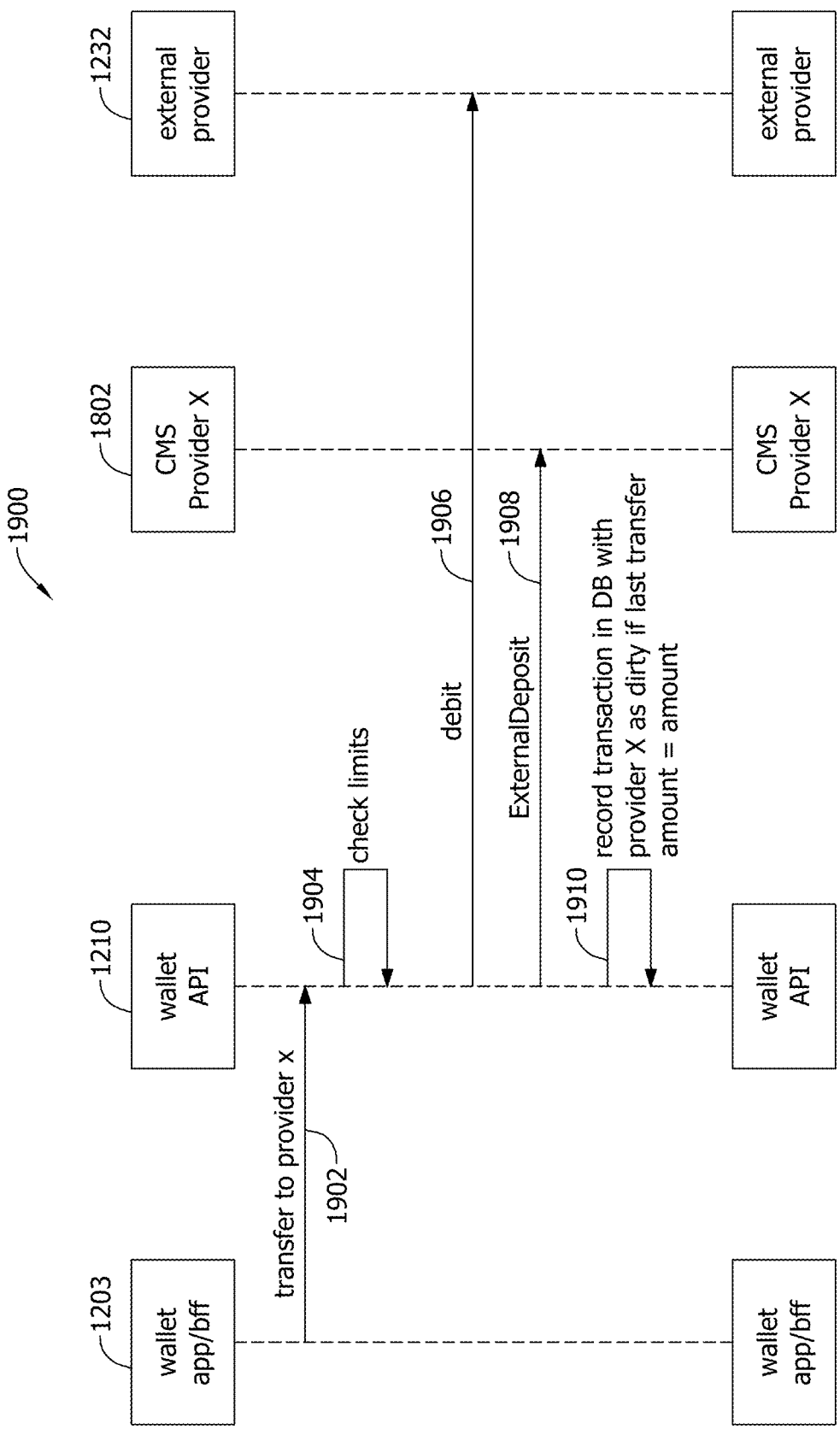
FIG. 19A illustrates an example download funds process implemented by the system shown in FIG. 12.

FIG. 19A illustrates an example download funds process 1900 implemented by system 1200. As shown in FIG. 19A, process 1900 is implemented by wallet app 1203, wallet API 1210, casino management system 1802 (e.g., 114 and/or including a local PAM system), and external funding provider 1232.

In the example embodiment, process 1900 includes a transfer request 1902 initiated at wallet app 1203 (e.g., by a player) and transmitted to wallet API 1210. Wallet API 1210 checks 1904 a limit (e.g., a deposit limit for player for player responsibility purposes (e.g., as set by a player and/or provider)) to ensure the limit would not be exceeded by an amount included in transfer request 1902. If the limit will not be exceeded, wallet API 1210 debits 1906 external funding provider 1232 by the amount requested and deposits 1908 the amount requested in a player wallet account at casino management system 1802 (e.g., a localized wallet account). Upon the deposit, wallet API 1210 records 1910 the transaction in a database (e.g., 1804) including a dirty flag if an amount greater than zero was deposited (e.g., to indicate that a balance is currently in a player account at casino management system 1802).

Figure 19B:
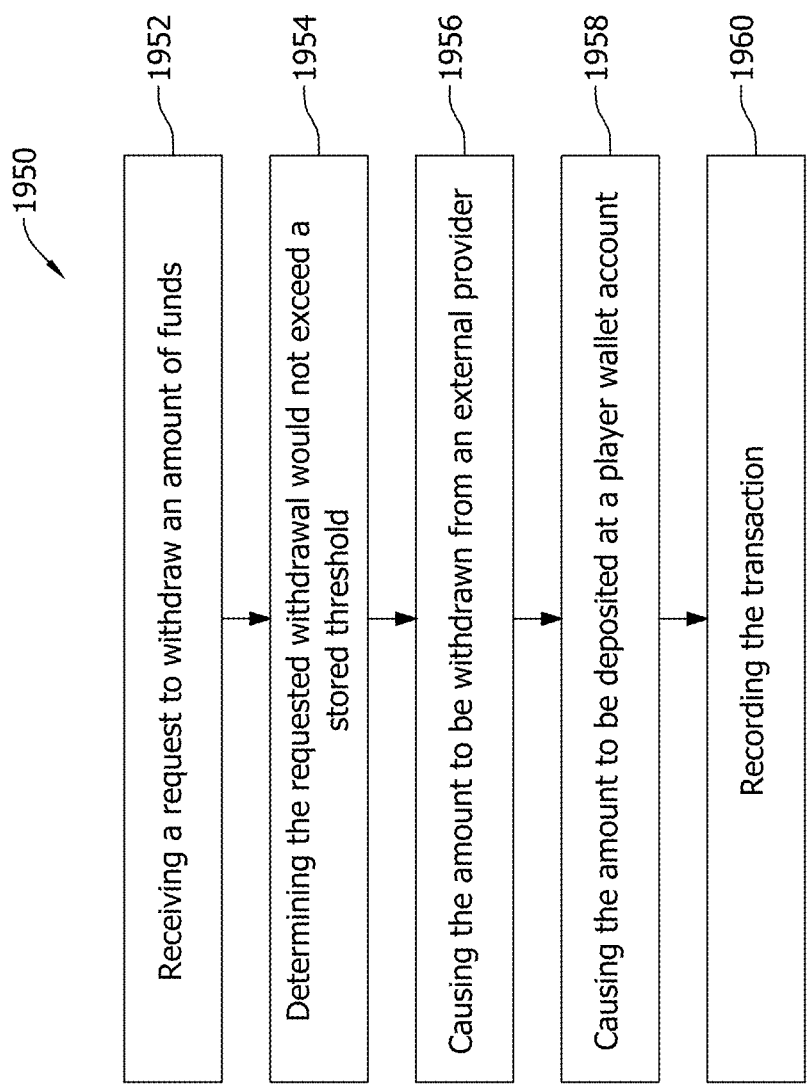
FIG. 19B illustrates an example method associated with the download funds process shown in FIG. 19A.

FIG. 19B illustrates an example method 1950 associated with download funds process 1900. In the example embodiment, method 1950 includes receiving 1952 a request to withdraw an amount of funds, determining 1954 the requested withdrawal would not exceed a stored threshold, causing 1956 the amount to be withdrawn from an external provider, causing 1958 the amount to be deposited at a player wallet account, and recording 1960 the transaction.

Figure 20A:
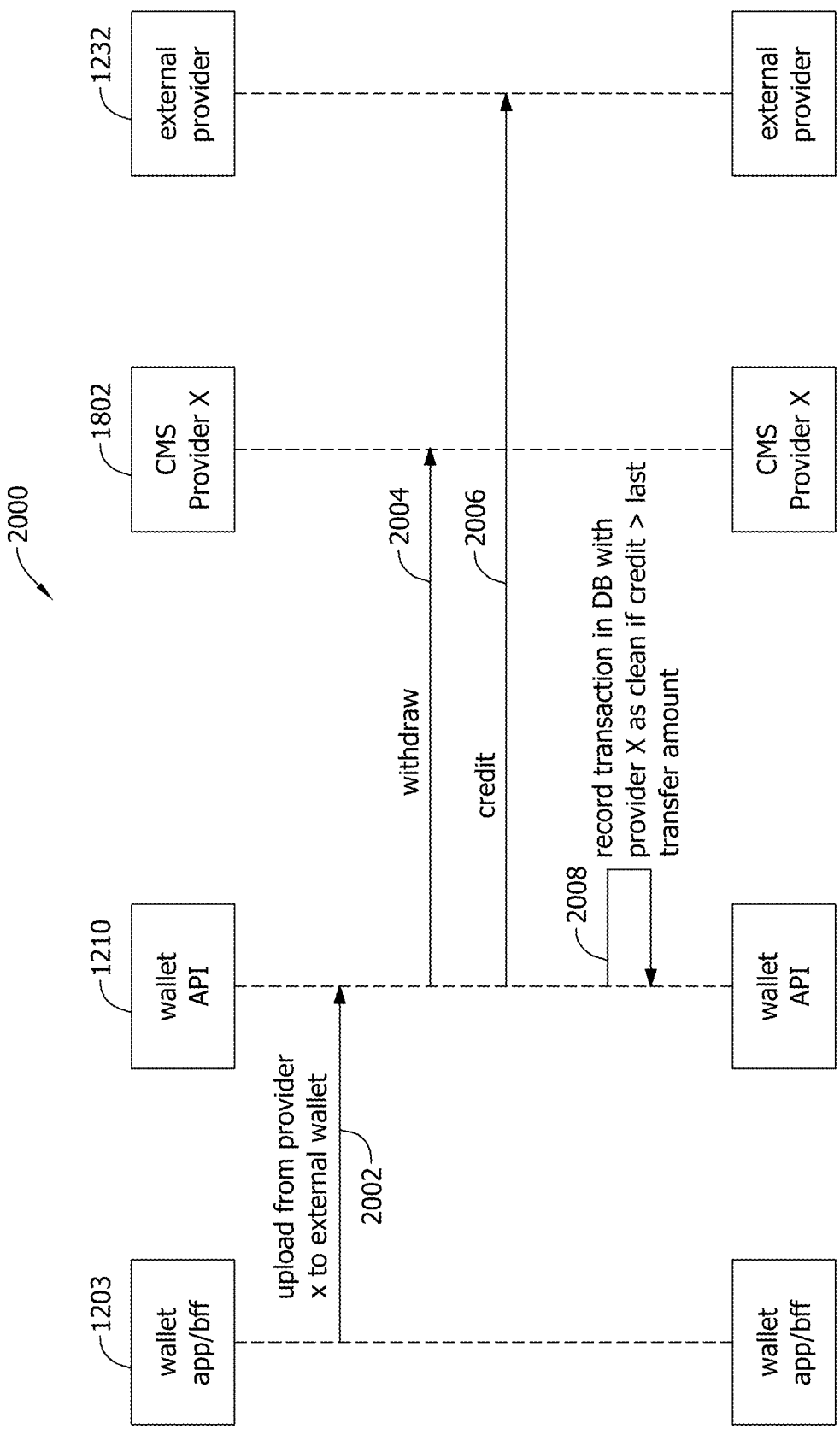
FIG. 20A illustrates an example upload funds process implemented by the system shown in FIG. 12.

FIG. 20A illustrates an example upload funds process 2000 implemented by system 1200. As shown in FIG. 20A, process 2000 is implemented by wallet app 1203, wallet API 1210, casino management system 1802 (e.g., 114 and/or including a local PAM system), and external funding provider 1232.

In the example embodiment, process 2000 includes an upload message 2002 transmitted from wallet app 1203 to wallet API 1210 requesting an upload be made. Wallet API 1210 then withdraws 2004 a requested amount (e.g., included in message 2002) from casino management system 1802 and credits 2006 the requested amount at external funding provider 1232. Then, the upload is stored 2008 as a "clean" upload in a database (e.g., 1804) if the requested amount that was uploaded is greater than a last downloaded/transferred amount stored in the database.

Figure 20B:
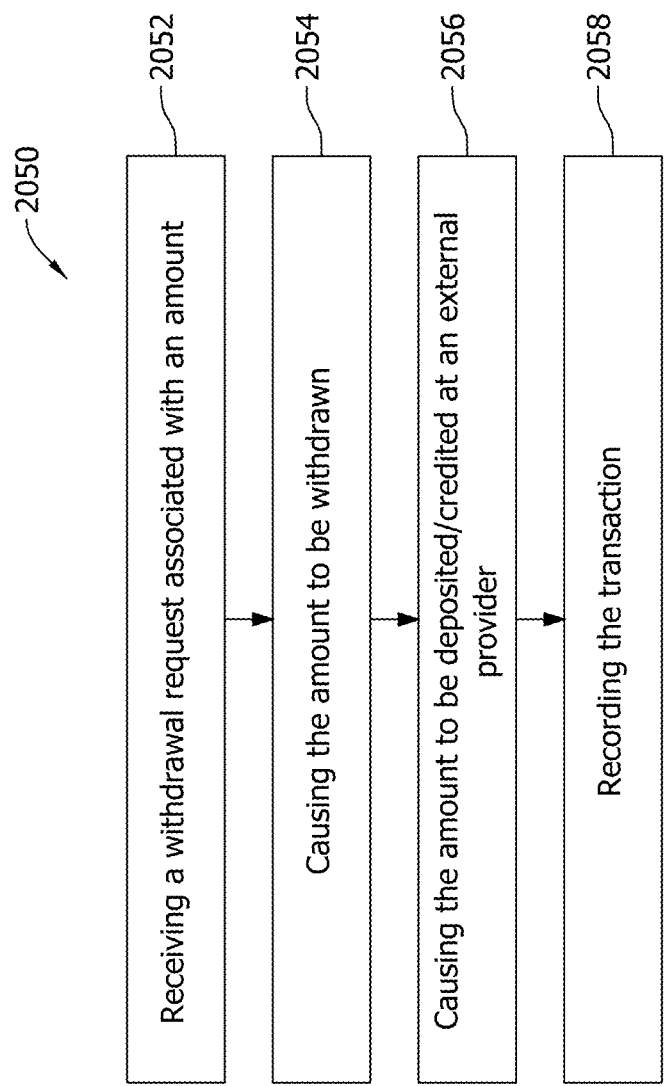
FIG. 20B illustrates an example method associated with the upload funds process shown in FIG. 20A.

FIG. 20B illustrates an example method 2050 associated with upload funds process 2000. In the example embodiment, method 2050 includes receiving 2052 a withdrawal request associated with an amount, causing 2054 the amount to be withdrawn (e.g., from a localized wallet account), causing 2056 the amount to be deposited/credited at an external provider, and recording 2058 the transaction.

Figure 21:
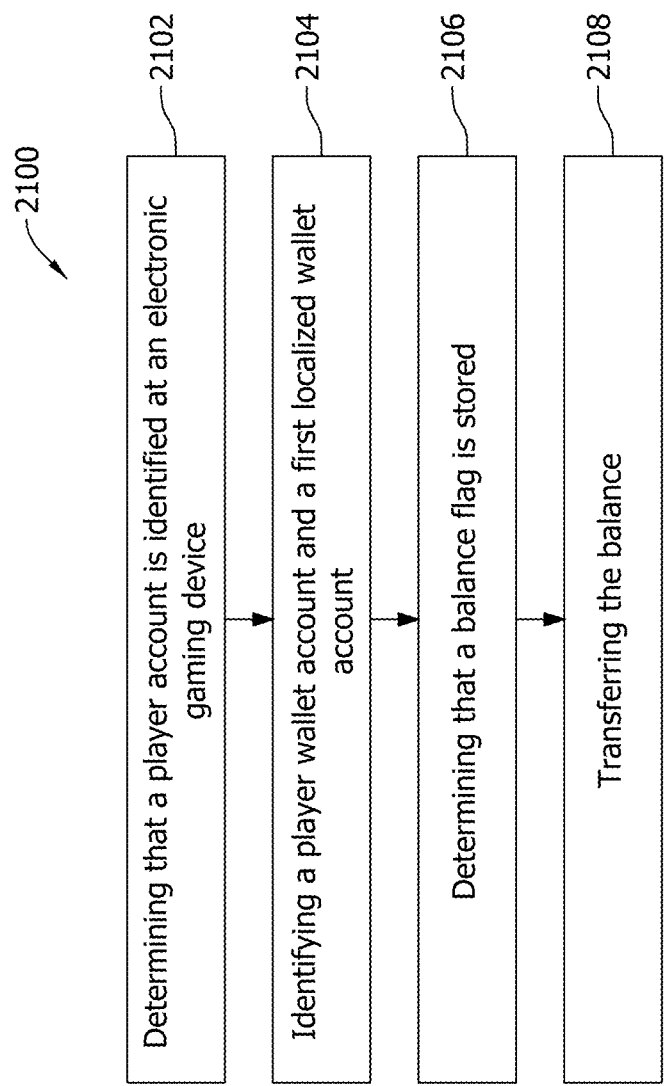
FIG. 21 illustrates an example method for electronic account transfers in casino environments, in accordance with the present disclosure.

FIG. 21 illustrates an example method 2100 for electronic account transfers in casino environments, in accordance with the present disclosure. In the example embodiment, method 2100 includes determining 2102 that a player account is identified at an electronic gaming device, of a plurality of electronic gaming devices, at a first property wherein the player account is associated with a player and identifying 2104 a player wallet account and a first localized wallet account associated with the player wallet account, the player, and the first property based upon the player account. Method 2100 also includes determining 2106 that a balance flag associated with a second localized wallet account associated with the player wallet account, the player, and a second property is stored, wherein the balance flag indicates a balance remaining in the second localized wallet account, and wherein the first property is a current location of the player and the second property is a previous location of the player and transferring 2108 the balance from the second localized wallet account to the first localized wallet account wherein the balance is available at the electronic gaming device upon completion of the transfer.

In some embodiments, method 2100 includes identifying an updated balance in the first localized wallet account upon a game session ending at the electronic gaming device and storing a new balance flag wherein the new balance flag indicates that the updated balance is remaining in the first localized wallet account. For example, method 2100 may include determining that the player account is identified at a second electronic gaming device, of the plurality of electronic gaming devices, at a third property, identifying the wallet player account and a third localized wallet account associated with the player wallet account, the player, and the third property, determining that the new balance flag associated with the wallet player account and the first localized wallet account is stored, and transferring the updated balance from the first localized wallet account to the third localized wallet account such that upon completion of the transfer of the updated balance, the updated balance is available at the second electronic gaming device.

In some embodiments, method 2100 includes withdrawing the balance from the second localized wallet account, selecting a provider type parameter identifying a funding type being the second localized wallet account, wherein the player wallet account includes a casino wagering account, and depositing the balance in the first localized wallet account via a funding message including the provider type parameter. In some embodiments, method 2100 includes determining that the player account is identified at the electronic gaming device at the first property by receiving and analyzing a message from a device associated with the first property based upon a card-in by the player at the electronic gaming device wherein the message includes a provider name parameter based on a name of the first property.

In some embodiments, method 2100 includes determining that the first property and the second property are located in the same jurisdiction and based upon determining that the second localized wallet account includes a balance and that the first property and the second property are located in the same jurisdiction, transferring the balance.

In some alternative embodiments, the PAM system is configured to store multiple wallet flags (e.g., associated with different corporations). For instance, the PAM system may receive first player account registration data (e.g., associated with a first player) from a first electronic gaming device associated with a first electronic gaming establishment. The PAM system then determines that a digital wallet associated with the first player is stored in a wallet database by causing the wallet database to be searched for the digital wallet based on the first player account registration data. The PAM system further stores the first player account registration data for the first electronic gaming establishment as a first player account with a first wallet flag indicating the digital wallet associated with the first player is stored in the wallet database.

The PAM system may then receive second player account registration data (e.g., associated with the first player, above) from a second electronic gaming device associated with a second electronic gaming establishment wherein the second player account registration data is associated with the first player. The PAM system is then configured to determine that the digital wallet associated with the first player is stored in the wallet database by causing the wallet database to be searched for the digital wallet based on the second player account registration data. The PAM system is further configured to store the second player account registration data for the second electronic gaming establishment as a second player account with a second wallet flag indicating the digital wallet associated with the first player is stored in the wallet database.

Then, upon the PAM system detecting the first player account at the first electronic gaming establishment at an electronic gaming device, the PAM system provides access to the digital wallet at the electronic gaming device, and upon detecting the second player account at the second electronic gaming establishment at an electronic gaming device, provides access to the digital wallet at the electronic gaming device.

Of course, data associated with more than two properties is envisioned as being managed by the PAM system. For example, the PAM system may receive third player account registration data (e.g., associated with the first player) from an electronic gaming device associated with a third electronic gaming establishment. The PAM system may then determine that the digital wallet associated with the first player is stored in the wallet database by causing the wallet database to be searched for the digital wallet based on the third player account registration data and store the third player account registration data for the third electronic gaming establishment in as a third player account with a third wallet flag indicating the digital wallet associated with the first player is stored in the wallet database. Then, upon detecting the third player account at the third electronic gaming establishment at an electronic gaming device, the PAM system may provide access to the digital wallet at the sixth electronic gaming device.

In some embodiments, the PAM system is also configured to identify when a player attempts to generate a duplicative player account at an establishment where that player already has a player account. Accordingly, the PAM system may merge the new account with the existing account to prevent duplicative accounts from existing. For example, the PAM system may receive third player account registration data (e.g., associated with the first player) from an electronic gaming device associated with the first electronic gaming establishment (e.g., above). The PAM system may then determine that the player account registration data is associated with the first player and that the first player account includes the first wallet flag and cause the third player account registration data to merge with the first player account registration data in the player account (e.g., to prevent duplicative accounts for the player at the first electronic gaming establishment).

Further, in some embodiments, the PAM system may receive player data indicating presence of the first player account at an electronic gaming device, determine that the first player account includes the first wallet flag, and transmit a confirmation to the third electronic gaming device, wherein the confirmation confirms first player account is associated with the digital wallet. For example, the electronic gaming device may then request access (e.g., via a local PAM system) to the digital wallet and be provided access to the digital wallet via the PAM system (e.g., for deposits and/or withdrawals).

The PAM system may also be configured to identify the presence of a player at a property and transmit player data (e.g., player tracking data, wallet data, credit balance data, etc.) to a device (e.g., an EGM) at that property. For example, the PAM system may receive electronic gaming data (e.g., associated with a first gaming session) associated with the player account at a first electronic gaming establishment and store the electronic gaming data in the player account. The PAM system may then receive player data from a first electronic gaming device indicating presence of the first player at the first electronic gaming establishment (e.g., indicating a card-in event at the establishment) and transmit at least a portion of the player data to the first electronic gaming device.

In some embodiments, a device associated with an establishment may first request that the PAM system identify whether a player has an existing account associated with that establishment. Then, upon the PAM system identifying the player has an existing account associated with the establishment, the device may request player account information associated with the existing account. If the player does not have an existing account, the device may prompt the player to create an account (e.g., and then transmit the registration information to the PAM system).

For example, the PAM system may receive player data indicating the presence of a first player at a first electronic gaming establishment, determine that a player account includes player account registration data associated with the first electronic gaming establishment, and transmit a confirmation to the first electronic gaming device (e.g., wherein the confirmation confirms the player account includes the first player account registration data associated with the first electronic gaming establishment). In response to the confirmation, the PAM system may receive a request for a portion of the player data from the first electronic gaming device, and, in response to receiving the request, transmit at least the portion of the player data to the first electronic gaming device.

Of course, these examples are not limited to a player account at a single establishment. For example, the PAM system may receive electronic gaming data associated with the player account at a second electronic gaming establishment and store the electronic gaming data in the player account. The PAM system may then receive player data from the second electronic gaming device indicating presence of the first player at the second electronic gaming establishment (e.g., in response to a card-in event by the first player at an EGM at the second gaming establishment) and transmit at least a portion of the player data to the second electronic gaming device.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:
   at least one memory device with instructions stored thereon; and at least one processor in communication with a plurality of electronic gaming devices and the at least one memory device, wherein the instructions, when executed by the at least one processor, cause the at least one processor to:
- receive digital wallet registration data from a wallet broker computer system, wherein the digital wallet registration data is associated with a digital wallet and comprises a digital wallet ID;
- determine that the digital wallet registration data is associated with a first player account stored at the at least one memory device;
- store a digital wallet flag and the digital wallet ID in the first player account, wherein the digital wallet flag indicates that the first player account is associated with the digital wallet; and
- upon receipt of player data based on a card-in event associated with the first player account at a respective electronic gaming device of a respective electronic gaming property comprising at least one of a first electronic gaming device at a first electronic gaming property or a second electronic gaming device at a second electronic gaming property:
  - determine that the player data is associated with the first player account based on the player data;
  - determine that the digital wallet flag is stored in the first player account; and
  - cause access to the digital wallet to be provided at the respective electronic gaming device including enabling transfer of an amount associated with the digital wallet to the respective electronic gaming device.

2. The electronic gaming system of claim 1, wherein the instructions further cause the at least one processor to receive digital wallet registration data from the wallet broker computer system, wherein the digital wallet registration data is generated by the wallet broker computer system in response to a request from an end user device associated with the first player account.

3. The electronic gaming system of claim 1, wherein the instructions further cause the at least one processor to transmit the digital wallet ID to a local player account management (PAM) system associated with the respective electronic gaming property, wherein in response to receiving the digital wallet ID, the PAM system communicates with the wallet broker computer system, thereby causing access to the digital wallet to be provided at the respective electronic gaming device.

4. The electronic gaming system of claim 3, wherein wallet data transmitted from the wallet broker computer system to the local PAM system is transmitted by the local PAM system to the respective electronic gaming device, and wherein the respective electronic gaming device is located at either the first electronic gaming property or the second electronic gaming property.

5. The electronic gaming system of claim 4, wherein the wallet data comprises wallet balance data associated with a balance of the digital wallet.

6. The electronic gaming system of claim 3, wherein the instructions further cause the at least one processor to:
- receive player account activity data associated with the first player account from the local PAM system;
- determine that the player account activity data satisfies an inactivity threshold comprising a number of days of inactivity; and
- inactivate the first player account based on the player account activity data satisfying the inactivity threshold.

7. The electronic gaming system of claim 1, wherein the instructions further cause the at least one processor to:
- identify a second player account associated with the first player account;
- determine that the first player account includes the digital wallet flag and the second player account does not include the digital wallet flag; and
- cause the second player account to merge into the first player account.

8. At least one non-transitory computer-readable storage medium with instructions stored thereon that, in response to execution by at least one processor, cause the at least one processor to:
- receive digital wallet registration data from a wallet broker computer system, wherein the digital wallet registration data is associated with a digital wallet and comprises a digital wallet ID;
- determine that the digital wallet registration data is associated with a first player account;
- store a digital wallet flag and the digital wallet ID in the first player account, wherein the digital wallet flag indicates that the first player account is associated with the digital wallet; and
- upon receipt of player data based on a card-in event associated with the first player account at a respective electronic gaming device of a respective electronic gaming property comprising at least one of a first electronic gaming device at a first electronic gaming property or a second electronic gaming device at a second electronic gaming property:
  - determine that the player data is associated with the first player account based on the player data;
  - determine that the digital wallet flag is stored in the first player account; and
  - cause access to the digital wallet to be provided at the respective electronic gaming device including enabling transfer of an amount associated with the digital wallet to the respective electronic gaming device.

9. The at least one non-transitory computer-readable storage medium of claim 8, wherein the instructions further cause the at least one processor to receive digital wallet registration data from the wallet broker computer system, wherein the digital wallet registration data is generated by the wallet broker computer system in response to a request from an end user device associated with the first player account.

10. The at least one non-transitory computer-readable storage medium of claim 8, wherein the instructions further cause the at least one processor to transmit the digital wallet ID to a local player account management (PAM) system associated with the respective electronic gaming property, wherein in response to receiving the digital wallet ID, the PAM system communicates with the wallet broker computer system, thereby causing access to the digital wallet to be provided at the respective electronic gaming device.

11. The at least one non-transitory computer-readable storage medium of claim 10, wherein wallet data transmitted from the wallet broker computer system to the local PAM system is transmitted by the local PAM system to the respective electronic gaming device, and wherein the respective electronic gaming device is located at either the first electronic gaming property or the second electronic gaming property.

12. The at least one non-transitory computer-readable storage medium of claim 11, wherein the wallet data comprises wallet balance data associated with a balance of the digital wallet.

13. The at least one non-transitory computer-readable storage medium of claim 10, wherein the instructions further cause the at least one processor to:
receive player account activity data associated with the first player account from the local PAM system;
determine that the player account activity data satisfies an inactivity threshold comprising a number of days of inactivity; and
inactivate the first player account based on the player account activity data satisfying the inactivity threshold.

14. The at least one non-transitory computer-readable storage medium of claim 8, wherein the instructions further cause the at least one processor to:
identify a second player account associated with the first player account;
determine that the first player account includes the digital wallet flag and the second player account does not include the digital wallet flag; and
cause the second player account to merge into the first player account.

15. A method for electronic account transfers in casino environments implemented by at least one processor in communication with at least one memory, the method comprising:
receiving digital wallet registration data from a wallet broker computer system, wherein the digital wallet registration data is associated with a digital wallet and comprises a digital wallet ID;
determining that the digital wallet registration data is associated with a first player account;
storing a digital wallet flag and the digital wallet ID in the first player account, wherein the digital wallet flag indicates that the first player account is associated with the digital wallet; and
upon receipt of player data based on a card-in event associated with the first player account at a respective electronic gaming device of a respective electronic gaming property comprising at least one of a first electronic gaming device at a first electronic gaming property or a second electronic gaming device at a second electronic gaming property:
determining that the player data is associated with the first player account based on the player data;
determining that the digital wallet flag is stored in the first player account; and
causing access to the digital wallet to be provided at the respective electronic gaming device including enabling transfer of an amount associated with the digital wallet to the respective electronic gaming device.

16. The method of claim 15, further comprising receiving digital wallet registration data from the wallet broker computer system, wherein the digital wallet registration data is generated by the wallet broker computer system in response to a request from an end user device associated with the first player account.

17. The method of claim 15, further comprising transmitting the digital wallet ID to a local player account management (PAM) system associated with the respective electronic gaming property, wherein in response to receiving the digital wallet ID, the PAM system communicates with the wallet broker computer system, thereby causing access to the digital wallet to be provided at the respective electronic gaming device.

18. The method of claim 17, wherein wallet data transmitted from the wallet broker computer system to the local PAM system is transmitted by the local PAM system to the respective electronic gaming device, wherein the wallet data comprises wallet balance data associated with a balance of the digital wallet, and wherein the respective electronic gaming device is located at either the first electronic gaming property or the second electronic gaming property.

19. The method of claim 17, further comprising:
receiving player account activity data associated with the first player account from the local PAM system;
determining that the player account activity data satisfies an inactivity threshold comprising a number of days of inactivity; and
inactivating the first player account based on the player account activity data satisfying the inactivity threshold.

20. The method of claim 15, further comprising:
identifying a second player account associated with the first player account;
determining that the first player account includes the digital wallet flag and the second player account does not include the digital wallet flag; and
causing the second player account to merge into the first player account.

* * * * *